US010562643B1

(12) United States Patent
Strabala et al.

(10) Patent No.: US 10,562,643 B1
(45) Date of Patent: Feb. 18, 2020

(54) CONTINGENCY LANDING SITE MAP GENERATION SYSTEM

(71) Applicants: Near Earth Autonomy, Inc., Pittsburgh, PA (US); Carnegie Mellon University, Pittsburgh, PA (US)

(72) Inventors: Kyle Strabala, Pittsburgh, PA (US); Sebastian Scherer, Pittsburgh, PA (US); Vaibhav Arcot, Pittsburgh, PA (US)

(73) Assignees: NEAR EARTH AUTONOMY, INC., Pittsburgh, PA (US); CARNEGIE MELLON UNIVERSITY, Pittsburgh, PA (US)

( * ) Notice: Subject to any disclaimer, the term of this patent is extended or adjusted under 35 U.S.C. 154(b) by 46 days.

(21) Appl. No.: 15/923,327

(22) Filed: Mar. 16, 2018

Related U.S. Application Data

(60) Provisional application No. 62/472,233, filed on Mar. 16, 2017.

(51) Int. Cl.
 | | |
 |---|---|
 | *B64D 45/08* | (2006.01) |
 | *G05D 1/10* | (2006.01) |
 | *G05D 1/00* | (2006.01) |

(52) U.S. Cl.
CPC .......... *B64D 45/08* (2013.01); *G05D 1/0088* (2013.01); *G05D 1/101* (2013.01)

(58) Field of Classification Search
CPC ........ G05D 1/0088; G05D 1/101; B64F 5/60; B64D 45/00
See application file for complete search history.

(56) References Cited

U.S. PATENT DOCUMENTS

| | | | |
|---|---|---|---|
| 7,689,328 B2 | 3/2010 | Spinelli | |
| 8,798,922 B2* | 8/2014 | Tillotson | G05D 1/101 |
| | | | 701/469 |
| 10,074,284 B1* | 9/2018 | Priest | G05D 1/101 |
| 2008/0167763 A1* | 7/2008 | Duranti | G05D 1/105 |
| | | | 701/11 |

(Continued)

OTHER PUBLICATIONS

Tang et al., "Prognostics-enhanced Automated Contingency Management for Advanced Autonomous Systems", 2008 International Conference on Prognostics and Health Management, 9 pages.

(Continued)

*Primary Examiner* — Abby Y Lin
*Assistant Examiner* — Renee LaRose
(74) *Attorney, Agent, or Firm* — K&L Gates LLP

(57) ABSTRACT

A computer system determines contingency landing sites for an aircraft, piloted or autonomous. The computer system decomposes data from various types of maps into multiple separate risk maps, which can include: one for the risk to people being present on the ground at the landing site; one for the risk of damage to property on the ground at the landing site; one for the risk of damage to the aircraft; and/or one for the risk to people on-board the aircraft. From these maps, the computer system generates a contingency landing site map that the aircraft can use to determine an appropriate landing site in the case of an emergency. The computer system can also perform landing simulations to determine the various risks.

25 Claims, 19 Drawing Sheets
(12 of 19 Drawing Sheet(s) Filed in Color)

(56) References Cited

U.S. PATENT DOCUMENTS

2013/0035810 A1* 2/2013 Spinelli ............... G05D 1/0676
701/17
2013/0179011 A1* 7/2013 Colby ................... G01C 21/20
701/16

OTHER PUBLICATIONS

Mejias et al, "Forced Landing Technologies for Unmanned Aerial Vehicles: Towards Safer Operations", Aerial Vehicles, Chapter 21, T. Lam ed., 2009, pp. 415-442.
DiFelici et al., "UAS Safety Planning and Contingency Assessment and Advisory Research", 2016 Integrated Communications Navigation and Surveillance (ICNS) Conference, Apr. 2016, pp. 8E3-1-8E3-16.

* cited by examiner

LAND-COVER-BASED VDR MAP EXAMPLE

RISK TO PROPERTY MAP EXAMPLE

PEOPLE PRESENCE RISK MAP EXAMPLE

US 10,562,643 B1

CONTINGENCY LANDING SITE MAP GENERATION SYSTEM

PRIORITY CLAIM

The present application claims priority to U.S. provisional patent application Ser. No. 62/472,233, filed Mar. 16, 2017, with the same title and inventors are above, and which is incorporated herein by reference in its entirety.

STATEMENT REGARDING FEDERALLY SPONSORED RESEARCH

This invention was made with government support under Contract No. NNX16CL94P awarded by the National Aeronautics and Space Administration. The government has certain rights in the invention.

BACKGROUND

In nominal flight missions, an aircraft flies from its origination point to its intended destination, and is able to evaluate the landing site in order to determine an appropriate touchdown location within the landing site. In nominal flight missions, the aircraft, whether piloted or autonomous, is able to detect and avoid obstacles, and is able to navigate with or without a functioning GPS system. Nominal flight missions do not include contingency landings, which might be required immediately after failure of an important aircraft system, such as an engine or key sensors systems, including state estimation sensors for autonomous aircraft. When such a contingency occurs, the aircraft may have to make an immediate landing at a site that did not receive the typical evaluation associated with a nominal flight mission.

SUMMARY

In one general aspect, the present invention is directed to computer systems and methods that determine contingency landing sites for an aircraft, whether piloted or autonomous. The computer system, in various embodiments, decomposes data from various types of maps into multiple separate risk maps, which can include: one for the risk to people being present on the ground at the landing site; one for the risk of damage to property on the ground at the landing site; one for the risk of damage to the aircraft; and/or one for the risk to people on-board the aircraft. From these three maps, the computer system generates a contingency landing site map that the aircraft can use to determine an appropriate landing site in the case of an emergency. The computer system can also perform landing simulations to determine the various risks. That way, the likelihood of an effective contingency landing by the aircraft can be increased.

These and other benefits of the present invention will be apparent from the description that follows.

BRIEF DESCRIPTION OF THE SEVERAL VIEWS OF THE DRAWING

The patent or application file contains at least one drawing executed in color. Copies of this patent or patent application publication with color drawing(s) will be provided by the Office upon request and payment of the necessary fee.

Various embodiments of the present invention are described herein by way of example in connection with the following figures, wherein.

DESCRIPTION

In one general aspect, the present invention is directed to computer systems and methods that determine contingency landing sites for an aircraft, whether piloted or autonomous. The computer system could be included on the aircraft during its mission, or the contingency landing sites computed by the computer system could be computed "off-line" and uploaded or otherwise saved to an aircraft computer system for use by the aircraft computer system during a mission. Additionally, where the aircraft has sufficient wireless data bandwidth, the contingency landing sites and/or updates thereto could be computed on the ground during a mission and transmitted wirelessly to the aircraft during the mission.

Figure 1:
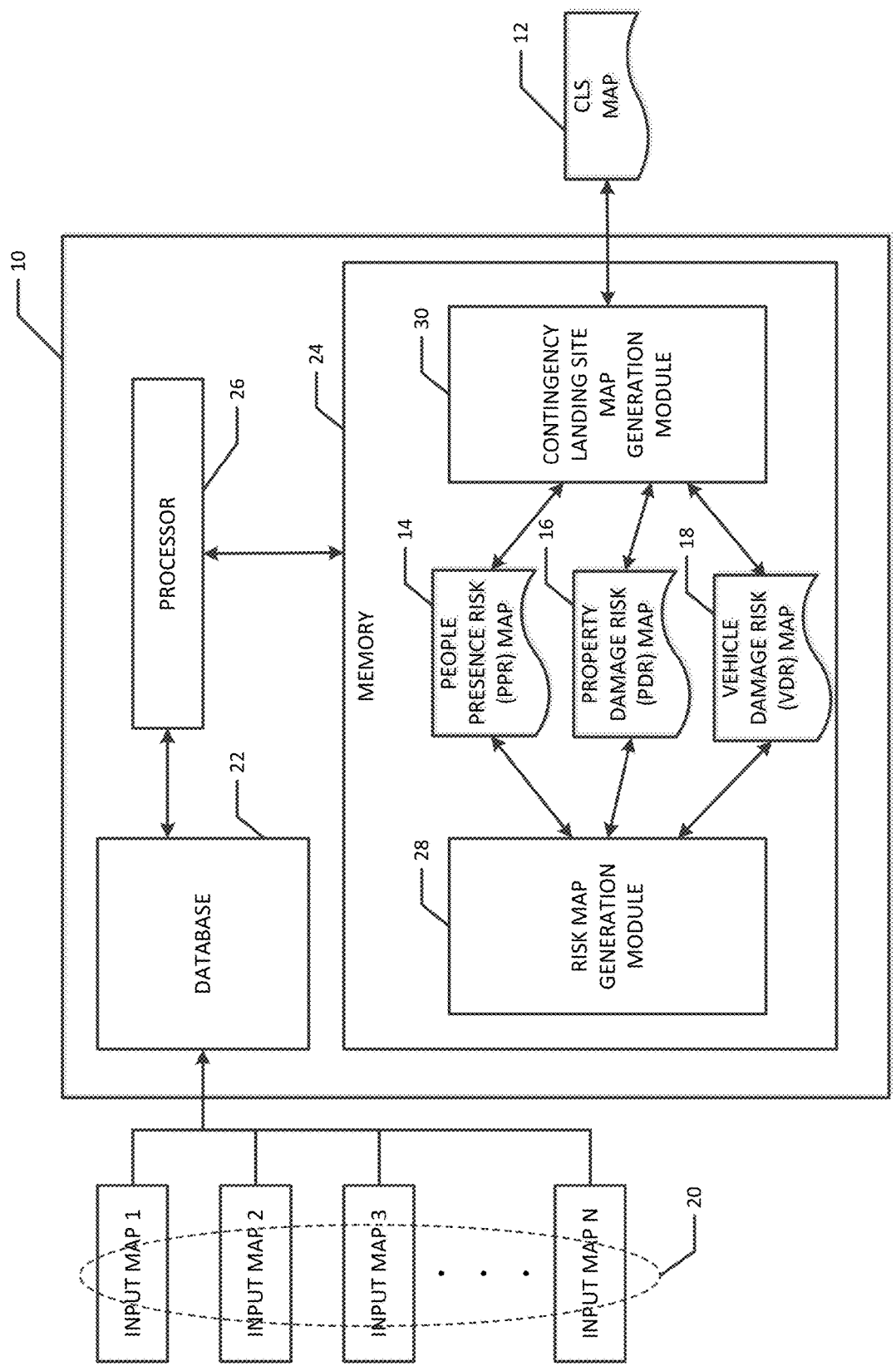
FIGS. 1 and 1A are block diagrams of a computer system that generates a contingency landing site map for an aircraft according to various embodiments of the present invention.

FIG. 1 illustrates such a computer system 10 according to embodiments of the present invention. The computer system 10 generates a contingency landing site (CLS) map 12 from three types of risk maps that it generates: a people presence risk (PPR) map 14; a property damage risk (PDR) map 16; and a vehicle (e.g., aircraft) damage risk (VDR) map 18. The computer system may generate one or more of each map type (e.g., multiple VDR maps 18) and each map 12-18 can be a digital map that indicates a value for each location on the map. The CLS map values indicate the suitability for each associated location on the map as a contingency landing site. The PPR map values indicate the likelihood that people will be present at each location on the map. The PDR map values indicate the likely risk of damage to property on the ground at each location if the location is used as the landing site. Finally, the VDR map values indicate the likely risk to damage to the aircraft at each location if the location is used as the landing site. As digital maps, the maps 12, 14, 16, 18 can have values for each (x,y) coordinate in the map, with each (x,y) coordinate corresponding to a geographic location. For each map, the values can range from 0.0 to 1.0 (or some other numeric range), with 0.0 being best (e.g., high suitability for landing, low likelihood of people or damage, etc.) and 1.0 being worst, for example. The values could be discrete or continuous in the range.

Figure 2:
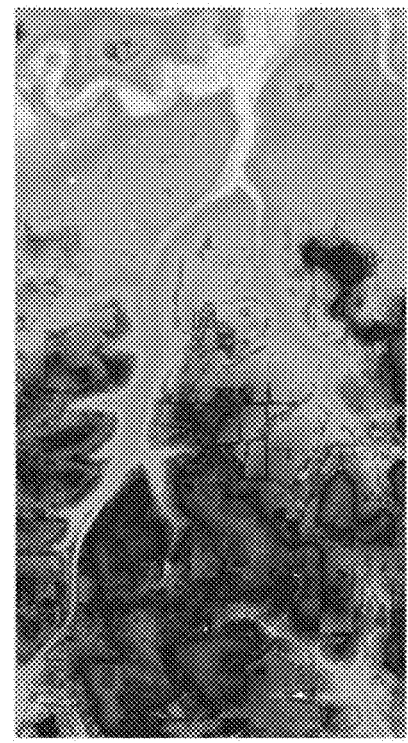
FIG. 2 shows example input maps for the system of FIG. 1.
Figure 2:
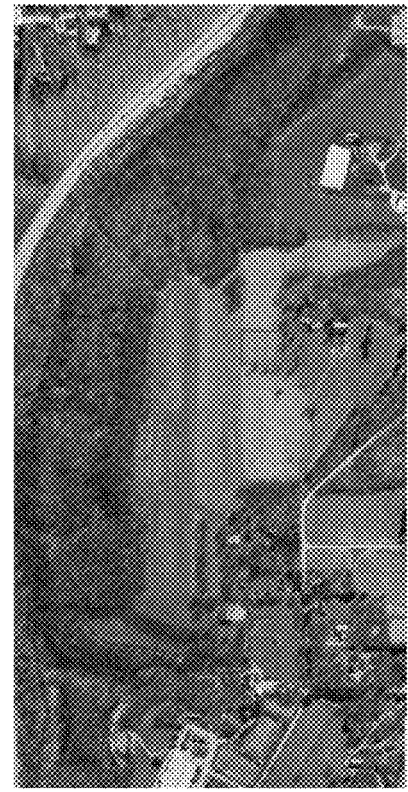
Figure 2:
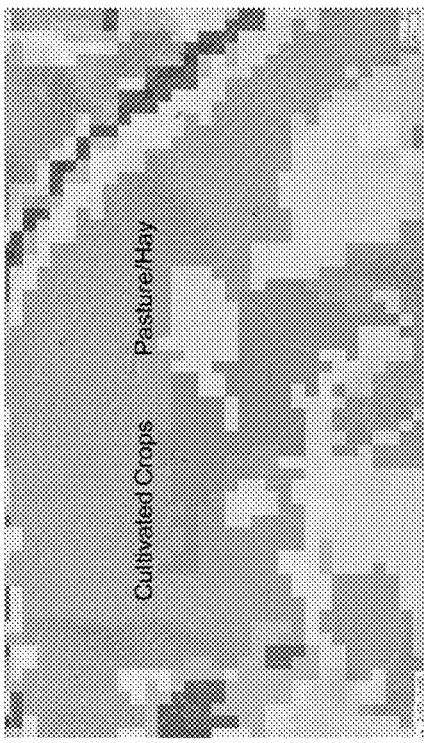
Figure 2:

The computer system 10 can generate the risk maps 14-18 from a number of other digital, input maps 20. The data from the input maps can be stored in a database 22 of the computer system 10 and used to generate the risk maps 14-18. Any suitable input maps could be used. For example, the input maps 20 could include a 3D digital elevation map (DEM) map, a land cover map, a roadway map, an aerial image map (e.g., in the visible spectrum), a lidar survey map (e.g. a point cloud), a color imagery map, etc. A land cover map indicates the physical material on the ground at each location on the map, e.g., roads, buildings, crops, trees, water, etc. A roadway map, such as those available from the National Transportation Safety Board (NTSB), can indicate where roads and railways are located in the map's coverage area. A lidar survey map is a 3D representation of objects in a space generated from lidar systems. Examples of these maps are shown in FIG. 2. The maps are in color to signify the different types of land cover. The data from these maps can be downloaded from available sites, e.g., the U.S. Geological Survey (USGS), the National Oceanic and Atmospheric Administration (NOAA) Coastal, and/or the NTSB or any other suitable site, or may be collected with various sensors (e.g., lidar, cameras, radars, etc.). Some or all of these maps or others, as described further below, can be used to generate the risk maps 14-18. The input maps 20 may have different resolutions that can be accounted for in generating the risk maps 14-18.

As shown in FIG. 1, the computer system 10 may include the database 22, one or more memory units 24, and one or more processors 26 (only one each is shown in FIG. 1 for simplicity). The memory unit 24 may store a risk map generation module 28 and a CLS map generation module 30. The risk map generation module 28 is software that is executed by the processor 26 in order to generate the risk maps 14-18. The CLS map generation module 30 is software that is executed by the processor 26 to generate the CLS map 12. The operation of these modules is described further below.

Figure 3:
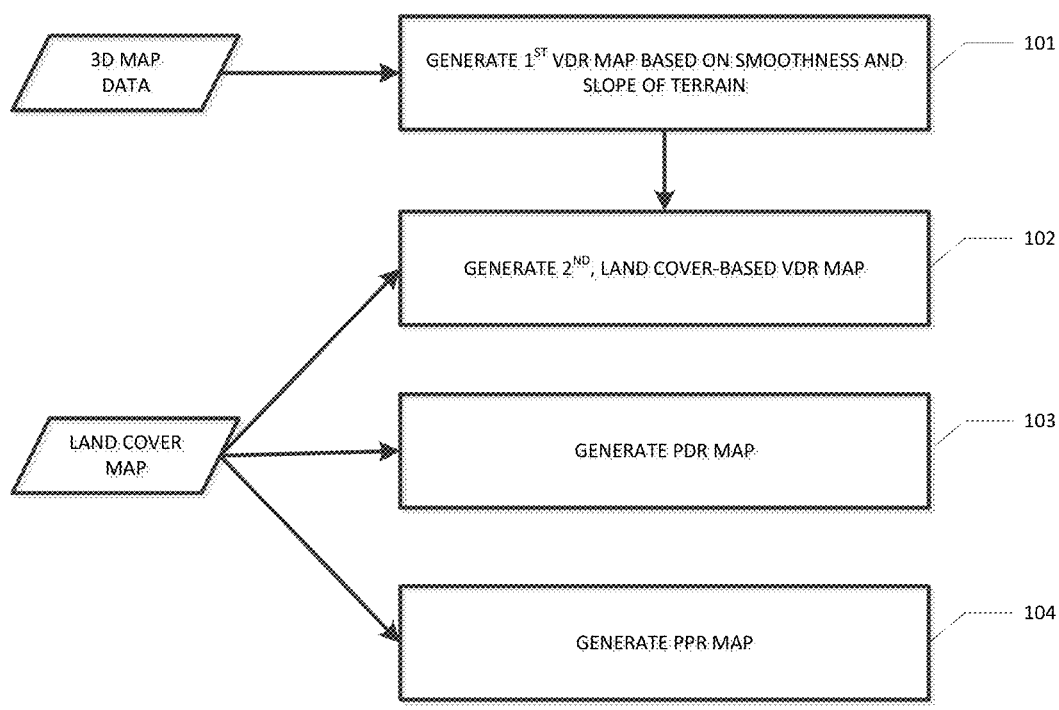
FIGS. 3 and 9 illustrate process flows for processes executed by the computer system of FIG. 1 according to various embodiments of the present invention.
Figure 4:
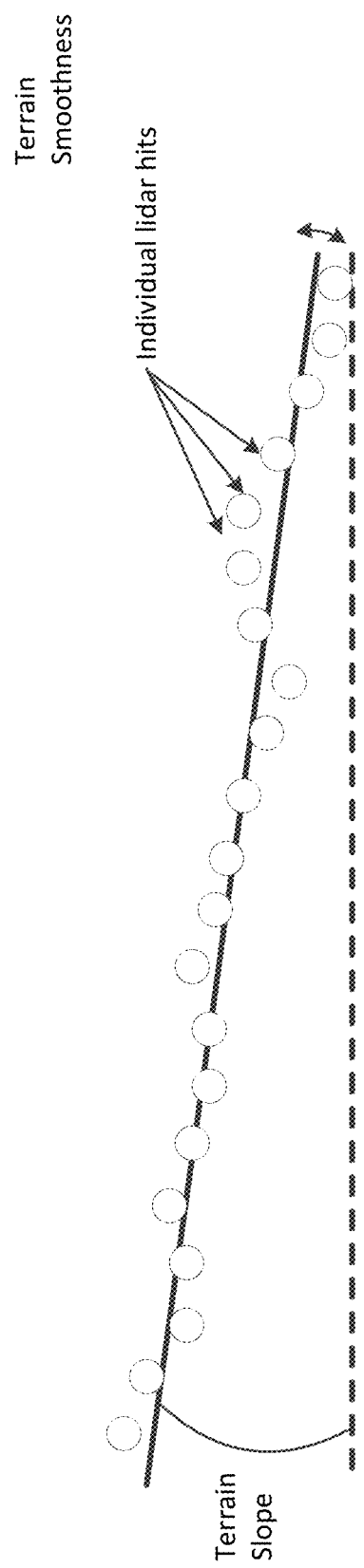
FIG. 4 illustrates a manner for determining terrain slope and smoothness from lidar data according to various embodiments of the present invention.

FIG. 3 illustrates one embodiment of the process performed by the processor 26 when it executes the software of the risk map generation module 28. First, at step 101, from any input maps 20 that have 3D terrain representations, such as a lidar point map, the computer system 10 can generate a first (e.g., lidar-based) VDR map based on the terrain's smoothness and slope. These metrics are valuable in determining a suitable landing spot for the aircraft—relatively smooth and unsloped locations are preferable. To determine the terrain's smoothness and slope, the lidar points can be fit to local terrain patches. The smoothness can be determined as a function of the standard deviation of the lidar data on any given terrain patch and the slope can be calculated directly from the data fit, as shown in FIG. 4.

Figure 5:
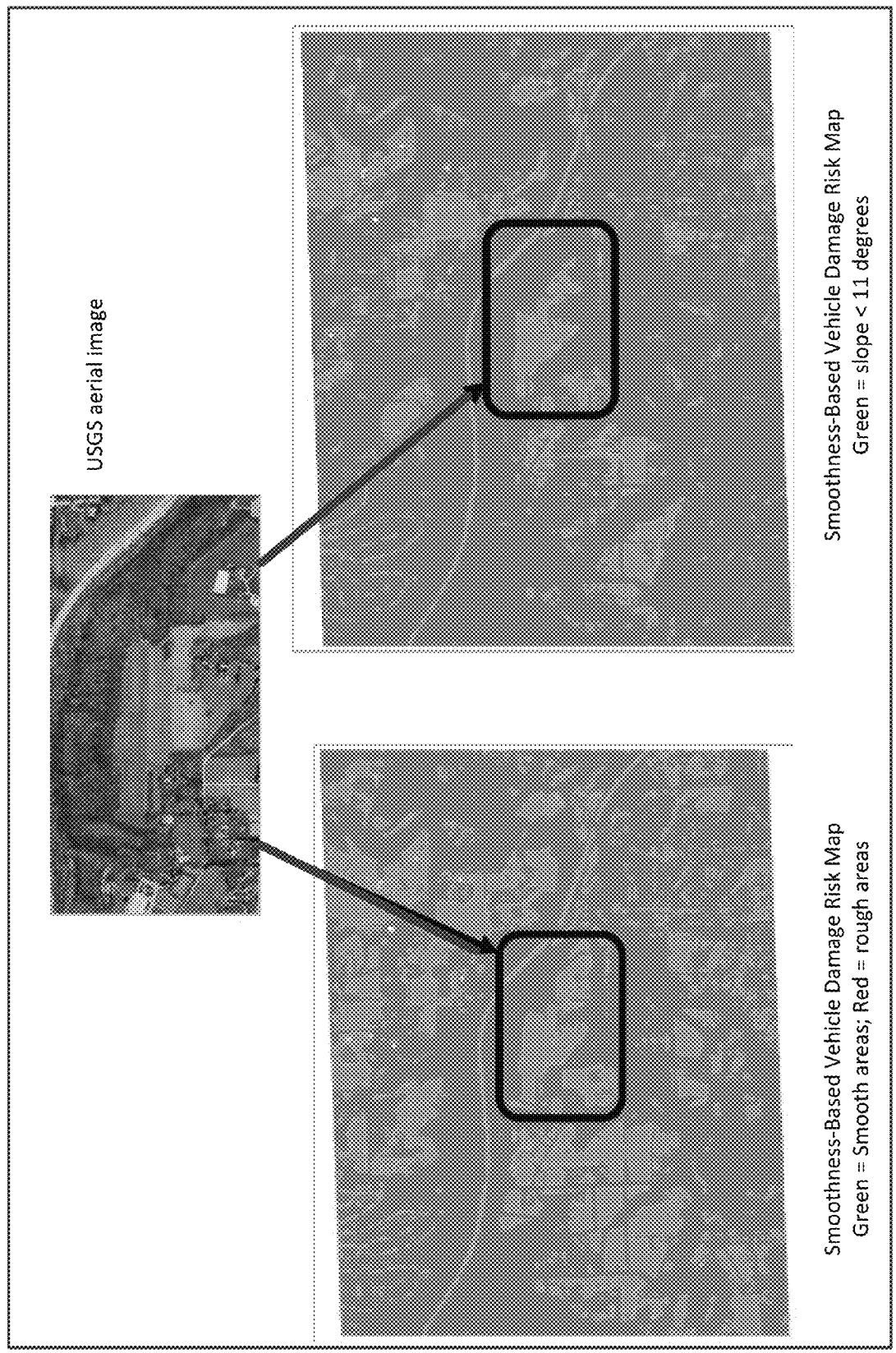
FIGS. 5 to 8 and 13 to 18 illustrate example risk maps according to various embodiments of the present invention; the risk maps are in color to indicate the different risks associated with each location in the maps.

Each location on the lidar-based VDR map can be assigned both a slope value and a smoothness value, each between 0.0 and 1.0 for example, with lower scores being better for landing the aircraft (i.e., more smoothness and less slope). For example, the terrain smoothness value can be set to 0.0 for a location on the VDR map 18 if the terrain smoothness at that location is below a certain threshold smoothness value (e.g., two meters), and set to 1.0 otherwise. In other embodiments, more discrete values (with different corresponding thresholds) or continuous values could be used for the smoothness value. Similarly, the slope values could be, for example:

0.0 if slope ≤2.8 degrees
0.5 if 2.8 degrees < slope ≤11 degrees
1.0 if slope >11 degrees Of course, in other embodiments, different threshold slope values could be used; there could be fewer or more discrete slope values; or the slope values could be continuous. FIG. 5 illustrates the terrain and smoothness scores for a plot of land computed according to this example. The most suitable areas for landing are areas that are green in each of the smoothness and slope plots, as described further below. The red areas are less suitable for landing.

Referring back to the flow chart of FIG. 3, next, at step 102, in various embodiments, the computer system can generate a second, different VDR map, this time a land cover-based VDR map. The land cover-based VDR map assigns a land cover-based VDR score at each location on the map based on a land cover input map(s) 20. The land cover input map(s) 20 may be from any suitable source, such as the USGS or some other source (or composite of such input maps) and may label each location on the map with an indication of the type of land cover at the location. The computer system 10, executing the risk map generation module 28, may translate each land cover indication to a land cover-based VDR score between 0.0 and 1.0, for example, as shown in the example of Table 1 below (see column titled "Land Cover-Based VDR Score").

TABLE 1

| LAND COVER TYPE | LAND COVER-BASED VDR SCORE | LAND COVER-BASED PDR SCORE | LAND COVER-BASED PPR SCORE |
|---|---|---|---|
| Open Water | 1.0 | 0.0 | 0.0 |
| Perennial Ice/Snow | 0.0 | 0.0 | 0.0 |
| Developed, Open Space | 0.5 | 0.5 | 0.5 |
| Developed, Low Intensity | 0.5 | 1.0 | 1.0 |
| Developed, Medium Intensity | 1.0 | 1.0 | 1.0 |
| Developed, High Intensity | 1.0 | 1.0 | 1.0 |
| Barren Land(Rock/Sand/Clay) | 0.0 | 0.0 | 0.0 |
| Deciduous Forest | 1.0 | 0.0 | 0.0 |
| Evergreen Forest | 1.0 | 0.0 | 0.0 |
| Mixed Forest | 1.0 | 0.0 | 0.0 |
| Dwarf Scrub | 0.5 | 0.0 | 0.0 |
| Shrub/Scrub | 0.5 | 0.0 | 0.0 |
| Grassland/Herbaceous | 0.5 | 0.0 | 0.0 |
| Sedge/Herbaceous | 0.0 | 0.0 | 0.0 |
| Lichens | 0.0 | 0.0 | 0.0 |
| Moss | 0.0 | 0.0 | 0.0 |
| Pasture/Hay | 0.0 | 0.5 | 0.0 |
| Cultivated Crops | 0.0 | 0.5 | 0.5 |
| Woody Wetlands | 1.0 | 0.0 | 0.0 |
| Emergent Herbaceous Wetlands | 1.0 | 0.0 | 0.0 |

Figure 6:
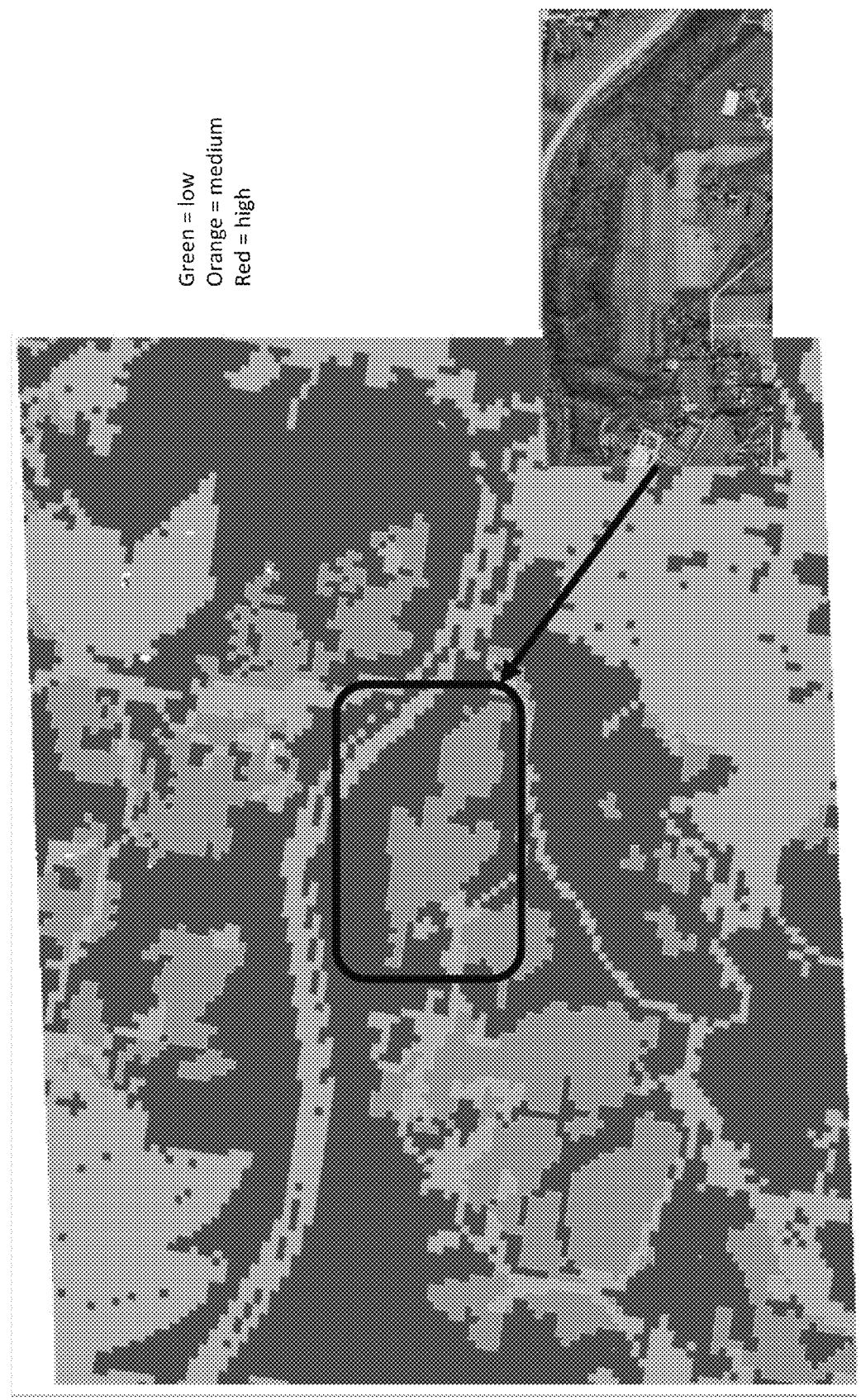

FIG. 6 shows an example of the results for such a land cover-based VDR map 18 for the same land plot as in FIG. 5 according to such an embodiment. In other embodiments, different scores can be used for different land covers.

Figure 7:
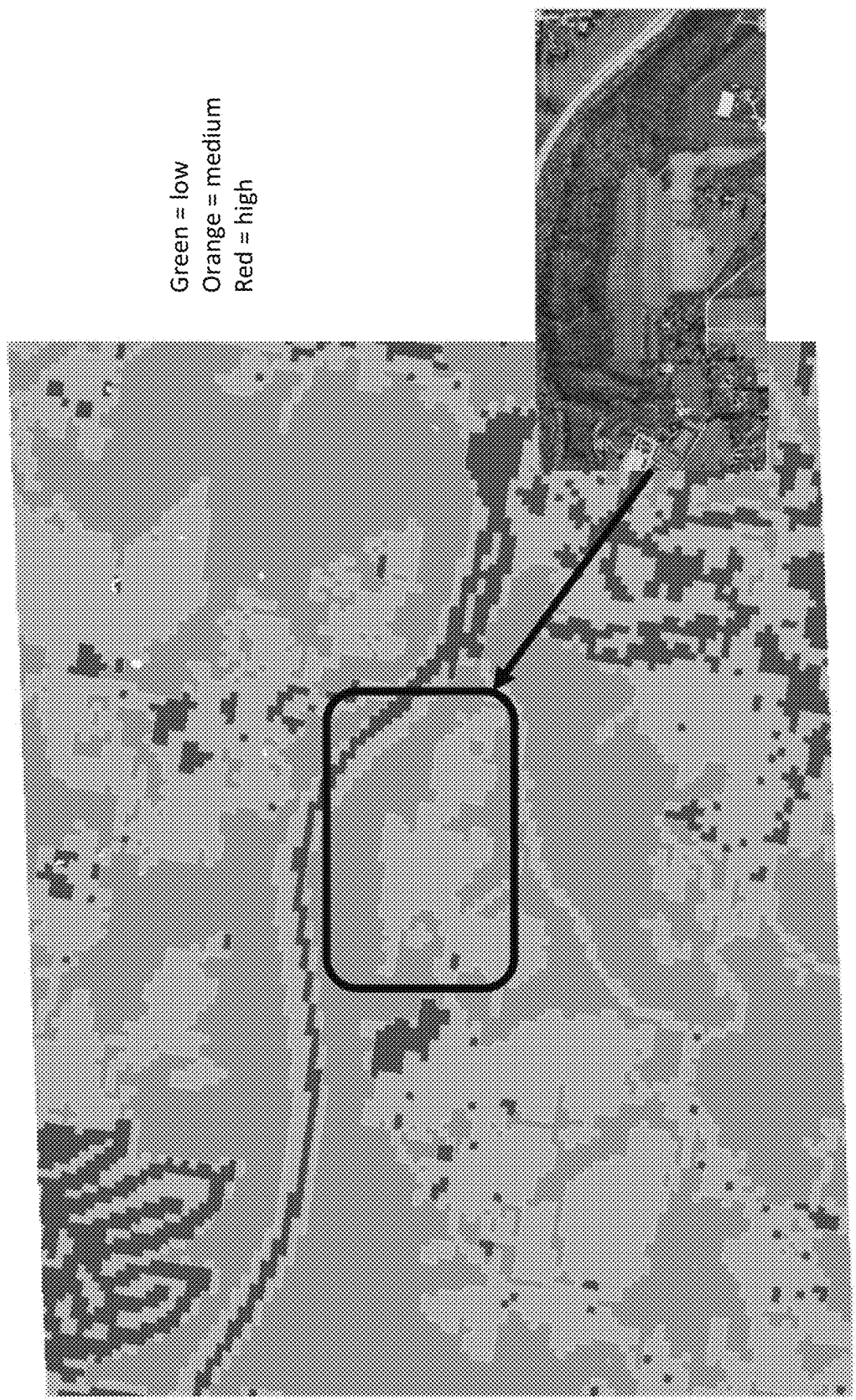

Referring back to FIG. 3, next, at step 103, in various embodiments, the computer system 10 can generate the PDR map 16 based on the land cover input map(s) 20 by assigning a PDR score to each location in the map based on the land cover input map(s) 20. The computer system 10, executing the risk map generation module 28, may translate each land cover indication to land cover-based PDR scores between 0.0 and 1.0, for example, as shown in the example of Table 1 above (see column titled "Land Cover-Based PDR Score"). FIG. 7 shows an example of the results for the risk to PDR map 16 for the same land plot as in FIGS. 5 and 6 according to such an embodiment.

Figure 8:
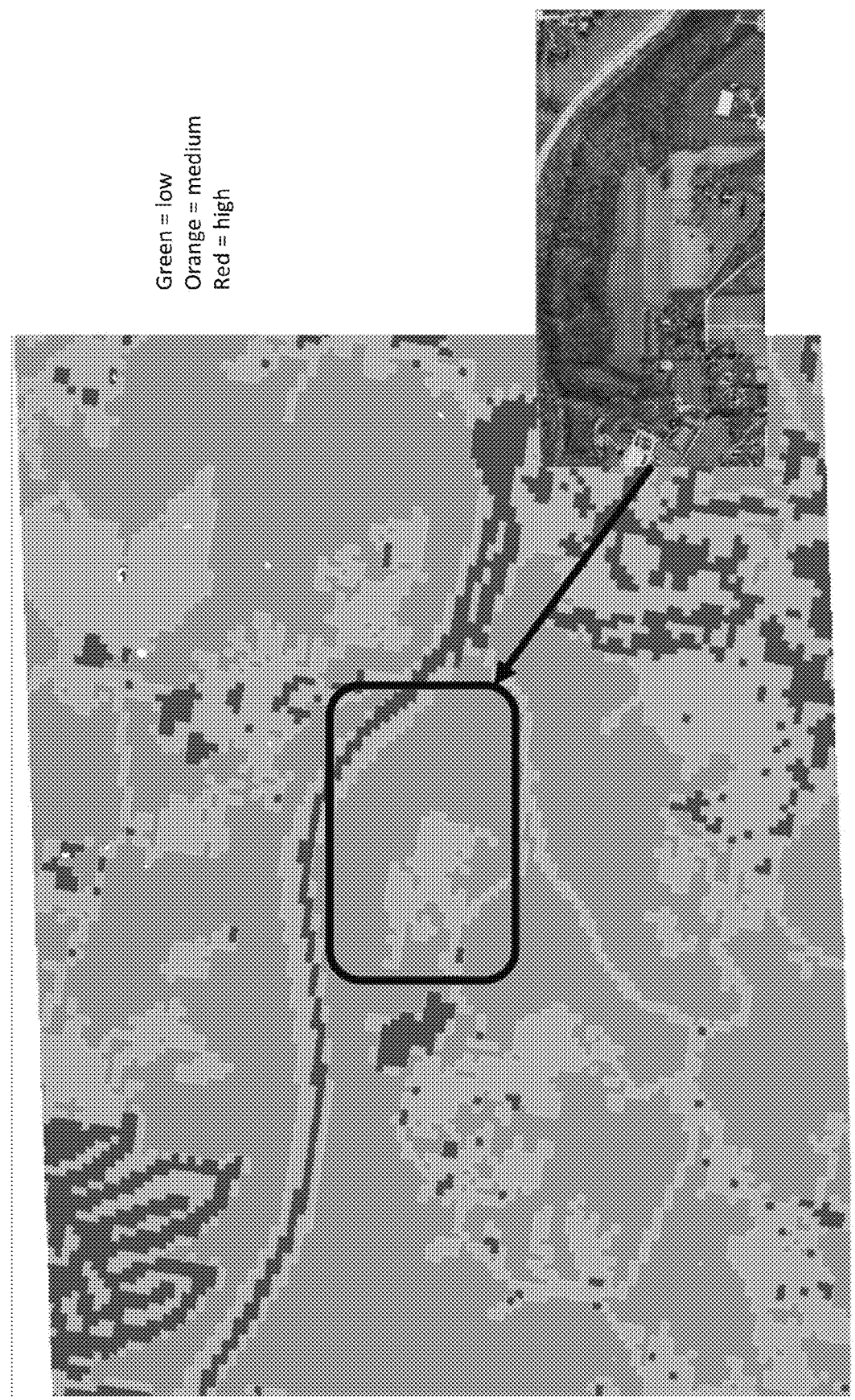

Similarly, at step 104, the computer system 10 can generate the PPR map 14 based on the land cover input map(s) 20 by assigning a PPR score to each location in the map based on the land cover input map(s) 20. The computer system 10, executing the risk map generation module 28, may translate each land cover indication to land cover-based PPR score between 0.0 and 1.0, for example, as shown in the example of Table 1 above (see column titled "Land Cover-Based PPR Score"). FIG. 8 shows an example of the results for the PPR map 14 for the same land plot as in FIGS. 5 through 7 according to such an embodiment.

When available, other and/or additional input maps 20 could be used than those described above in generating the risk maps 14-18. For example, NTSB road maps could be combined with the land cover maps to validate and/or improve the accuracy of the land cover determinations on the risk maps 14-18. Similarly, camera and/or lidar data captured during a prior flight (or flights) can be used to validate and/or improve the accuracy of the risk maps 14-18. Also, to deal with the issue that each input map 20 may not have the same resolution, low resolution input maps 20 can be scaled to high resolution by assuming that all additional higher resolution points (or pixels) within or associated with a low resolution point (or pixel) have the same condition as the low resolution point (or pixel). Also, the input maps 20 may have different coverages areas. Some could be the entire country or large portions of it, whereas other could be much more localized. To speed processing, the risk maps 14-18 may be limited to coverage areas that are relevant to an upcoming mission for the aircraft. That way, the computer system 10 does not need to spend time and resources determining the various risk levels for locations that are not relevant to the mission. Similarly, the CLS map 12 can be limited in coverage area to the areas covered by the risk maps 14-18.

Figure 9:
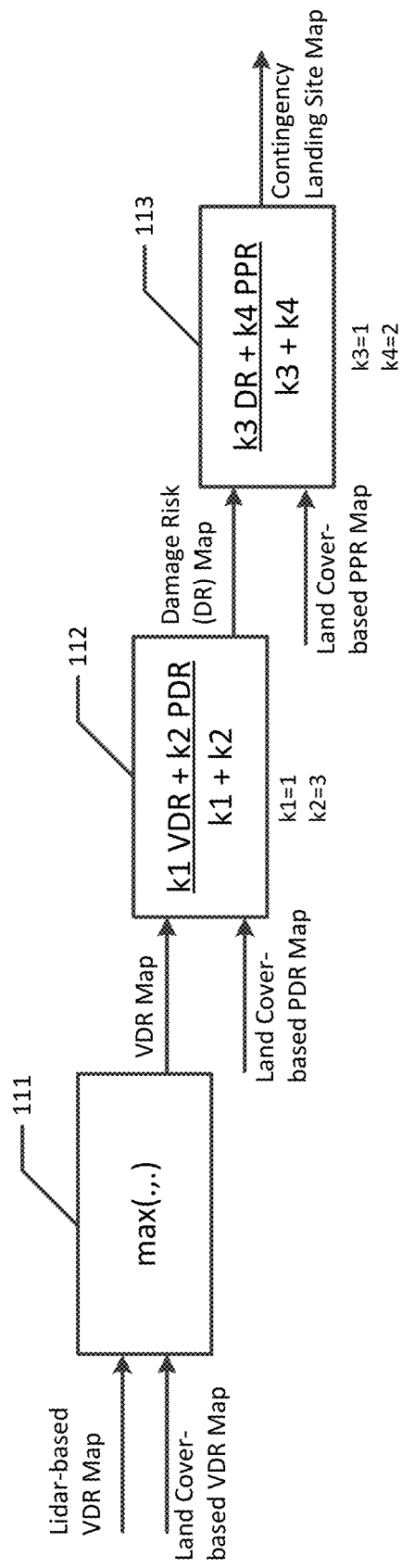

Referring back to FIG. 1, the computer system 10, executing the CLS map generation module 30, may then generate the CLS map 12 based on the risk maps 14-18. FIG. 9 illustrates one general example of an algorithm that the CLS map generation module 30 can use to generate the CLS map 12. As shown in FIG. 9 at step 111, the processor 26 (by executing the CLS map generation module 30) determines a composite VDR score for each location in the CLS map 18 using a function, which may be a "maximum" function as shown in FIG. 9. That is, the composite VDR score for each location in the CLS map 12 is the maximum of the smoothness score, the slope score and the land cover-based VDR score for that location. In other embodiments, a different function could be used to determine the composite VDR scores, such as a weighted average, etc.

Next, at step 112, the processor 26 (by executing the CLS map generation module 30) determines an overall vehicle and property damage risk (DR) score for each location in the CLS map 12. The DR score for a location may be computed as a function of the composite VDR score for the location (determined at step 111) and the land cover-based PDR score for the location. For example, in various embodiments, the DR score may be computed according to a function such as:

$$DR = k_1(VDR_c) + k_2(PDR)/k_1 + k_2$$

where PDR is the land cover-based PDR score for the location (e.g., determined at step 103 of FIG. 3), $VDR_c$ is the composite VDR score for the location (determined at step 111), and $k_1$ and $k_2$ are weighting coefficients. The weighting coefficients may be mission specific as explained further below depending on specifics of the mission (e.g., $k_1$=1.0 and $k_2$=3.0 as shown in FIG. 9).

Next, at step 113, the processor 26 (by executing the CLS map generation module 30) can factor in the PPR map 14 to compute an overall risk score for each location in the CLS map 12. The overall risk score for each location in the CLS map 12 can be computed as a function of the DR score for the location (computed at step 112) and the land cover-based PPR score for the location (determined at step 104 of FIG. 3). For example, in various embodiments, the overall risk score may be computed according to a function such as:

$$Risk = k_3(DR) + k_4(PPR)/k_3 + k_4$$

where $k_3$ and $k_4$ are mission-specific weighting coefficients (e.g., $k_3$=1.0 and $k_4$=2.0 as shown in FIG. 9).

The result of performing these algorithms is a value—the risk score—for each location on the CLS map that is indicative of the risk of executing an emergency landing of the aircraft at the location. As explained herein, the algorithms and variables could be set up so that lower numbers (e.g., 0.0) represent less composite risk in terms of people being present at the landing site, property damage, and vehicle (e.g., aircraft) damage and higher numbers (e.g., 1.0) represent greater risk.

Figure 1A:
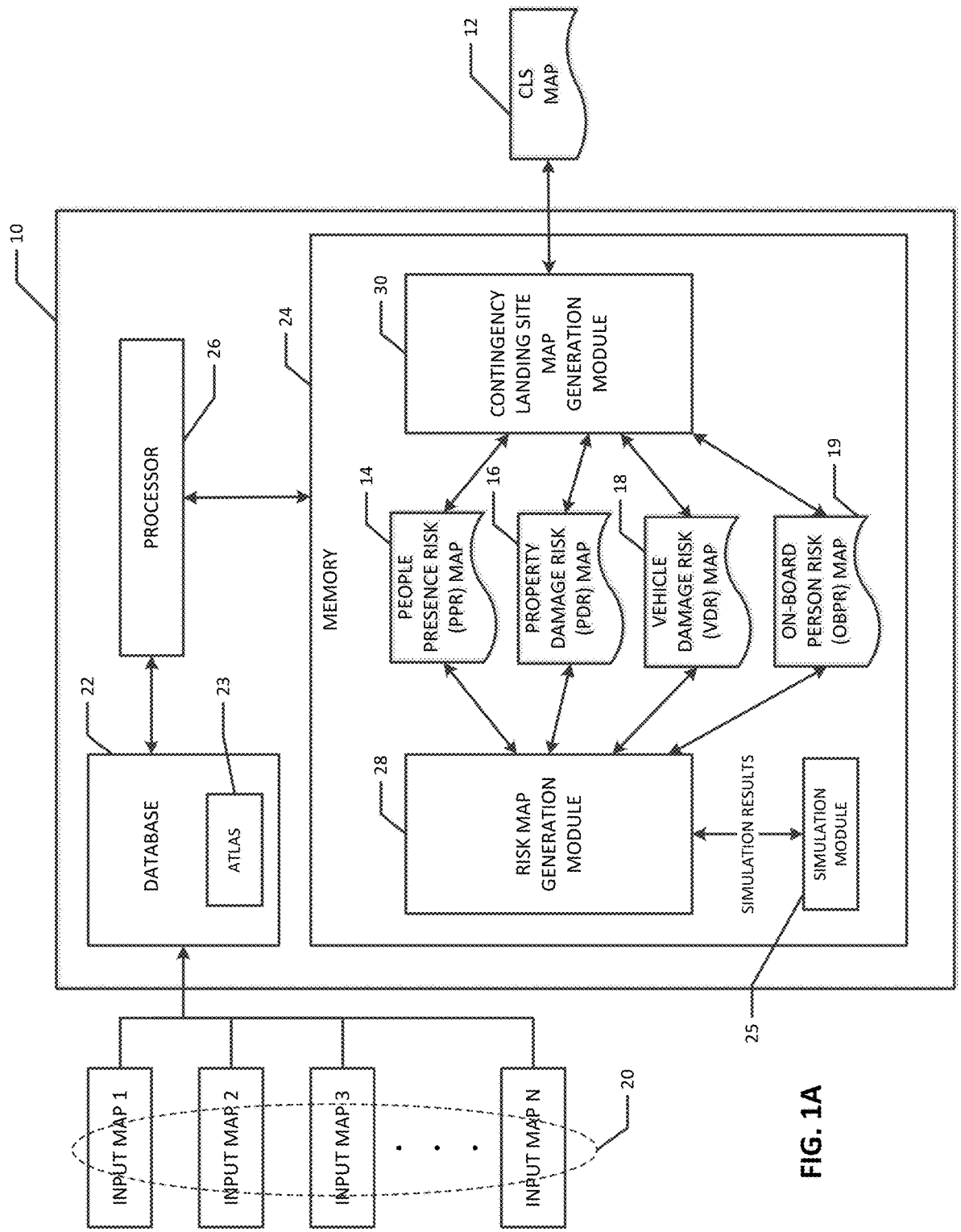
Figure 13:

FIG. 1A is a diagram of the computer system 10 according to other embodiments of the present invention. As shown in FIG. 1A, the datasets comprising the input maps 20 may be amalgamated into a digital atlas 23 that is stored in the database 22 and the risks may be calculated from this atlas as described herein. The atlas may be updated with new data sources when they become available. Preferably the atlas contains:

Newest version of the landcover, updated to add more classifications like road type, parks, hospitals, airports, etc., as shown in the example of FIG. 13, which shows the landcover map around an example airfield, here the Nardo Airfield near Pittsburgh, Pa., designated by the "Runway."
  Ground elevation at points and the maximum elevation of the object in that cell, such as height of the building or tree.
  Estimated property value and estimated number of people to be found, which is used in the individual risk calculation phase. This portion of the atlas can be updated by datasets like foot traffic or property cost.
  Physical properties of the objects in the cell, such as the energy required for a vehicle to pass through the objects and the coefficient of friction with the ground, both of which can be used in a landing simulation step, described below.

The reason all this information is preferably kept in the atlas is because it is easier to integrate data into a standard form and then use it for all subsequent calculations. Different datasets update different components of the atlas such as:

Digital elevation model (DEM) data would update the ground altitude at a point, because the DEM is an estimate of the bare earth.
  Lidar data preferably are used to update the maximum elevation of the object as well as classification of the object type and object properties, like type of vegetation.
  Property costs in a specific place preferably are used update the estimated property value, and traffic data would update both the people estimate as well as the property.

The atlas 23 could incorporate lidar data or it may use only DEM data to estimate the ground height and maximum elevation, making everything of the same height. Property costs in the relevant region could be used as the basis for the property value of structures, and data from the Federal Highway Administrations Urban Highways Average Annual Daily Traffic (AADT) could be used to estimate the number of people on highways, with scaled down estimates for neighborhood roads. Data from the Topologically Integrated Geographic Encoding and Referencing (TIGER) dataset could be used to update the landcover to include road types, but because the road data does not contain width (vector line data), the width of the roads can be estimated by the type of the road based on, for example, the Federal Highway Administration lane count in highways.

In various embodiments, the memory 24 of the computer system 10 may also comprise a simulation module 25 whose software, when executed by the processor(s) 26, simulates landing at various locations to determine what would happen during an approach and after touchdown. The simulation information can be input to the risk map generation module 28 in generating the various risk maps.

Execution of the simulation module 25 software by the processor(s) 26 may, for example, cause the processor(s) 26 to validate the approach and estimate the runway length. Validation of the approach is done to estimate where the point of impact would be at a given heading and target touchdown point. The simulations may be performed for any number of given headings, such as one (e.g., the expected direction of a mission), four (e.g., North, South, East and West), or more granular headings. The approach validation can be done, for example, against only ground features such as mountain faces or valleys. In other embodiments, the approach validation can be made more accurate by validating against the lidar data (e.g., higher fidelity simulations).

Figure 14:
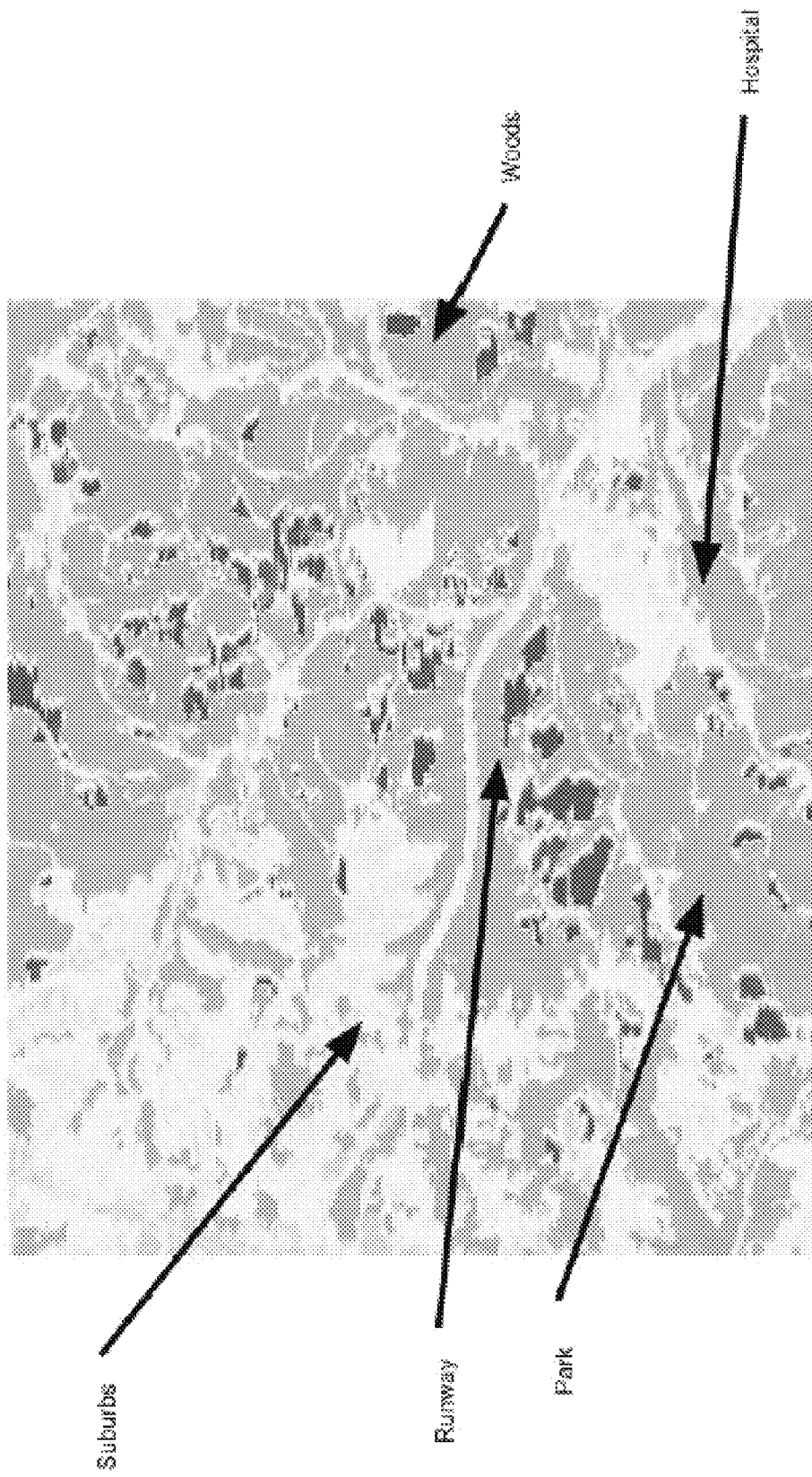

In one embodiment, the runway length simulation is performed once the point of contact has been determined. The runway length validation can use, for example, an energy model, where different landcover types remove different amounts of energy based on the type of the surface and objects present. Different surfaces and objects dissipate energy in different ways. For example, trees absorb the energy to break them, while roads have a friction force and water loses energy via a viscous force. These forces can be estimated based on past crash data and depend on the type of the vehicle. A sample runway map is shown in FIG. 14, where the runway length required to land is significantly higher in the case of a field than on a road. FIG. 14 shows the runway length for the area around the Nardo Airfield for a West approach for a fixed-wing aircraft class. In this diagram, red areas indicate a longer stopping distance and blue/green areas indicate a shorter distance.

In other implementations, additional risk maps could be employed, and some or all of the risks depicted by the various risk maps could be based on the simulations from the simulation module. For example, in addition to the PPR, PDR and VDR maps 14, 16, 18 described above, the risk map generation module 28 could also generate a vehicle person risk OBPR map 19, which estimates the risk to persons on-board the vehicle. This risk map could also be used by the contingency landing site map generation module 30 to generate the CLS map 12.

Figure 15:
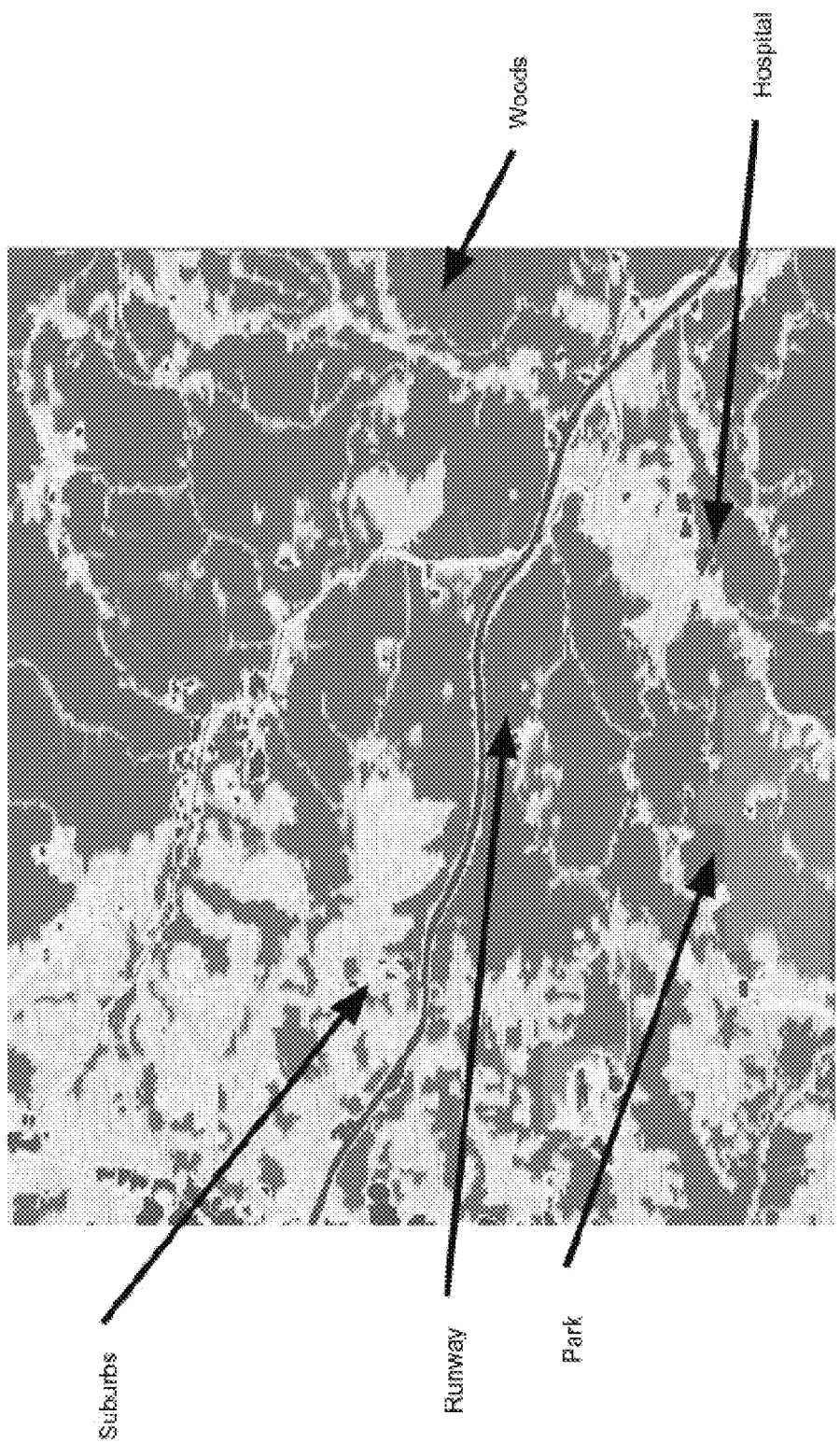

In the embodiments described above, the various risks were on the same scale, e.g., a number between 0 and 1. In other embodiments, an absolute scale could be used to allow meaningful comparisons. For example, the PPR risk for a location may be set as the total number of expected fatalities caused by landing at the location (e.g., "ground soles risk"). The value could be determined based on the landing profile and vehicle type, because some landing profiles would give some people enough time to get out of the way of the landing vehicle. In one embodiment, a landing profile defines the probability of death based on the Abbreviated Injury Scale (AIS) of injuries, which defines a score associated with a single injury. In order to generate a risk to the person's life, the maximum AIS score is taken as the risk to life. Based on the landing profile, the number of people is totaled and multiplied by the risk of life to generate an estimate. For example, the entire landing profile could be nearly fatal for a fixed-wing aircraft. FIG. 15 shows a sample PPR map for the Nardo region. As expected, the road (linear feature through central part of figure) and hospital (identified on the map) show as higher risk (red) than the suburbs or a park (blue).

Figure 16:
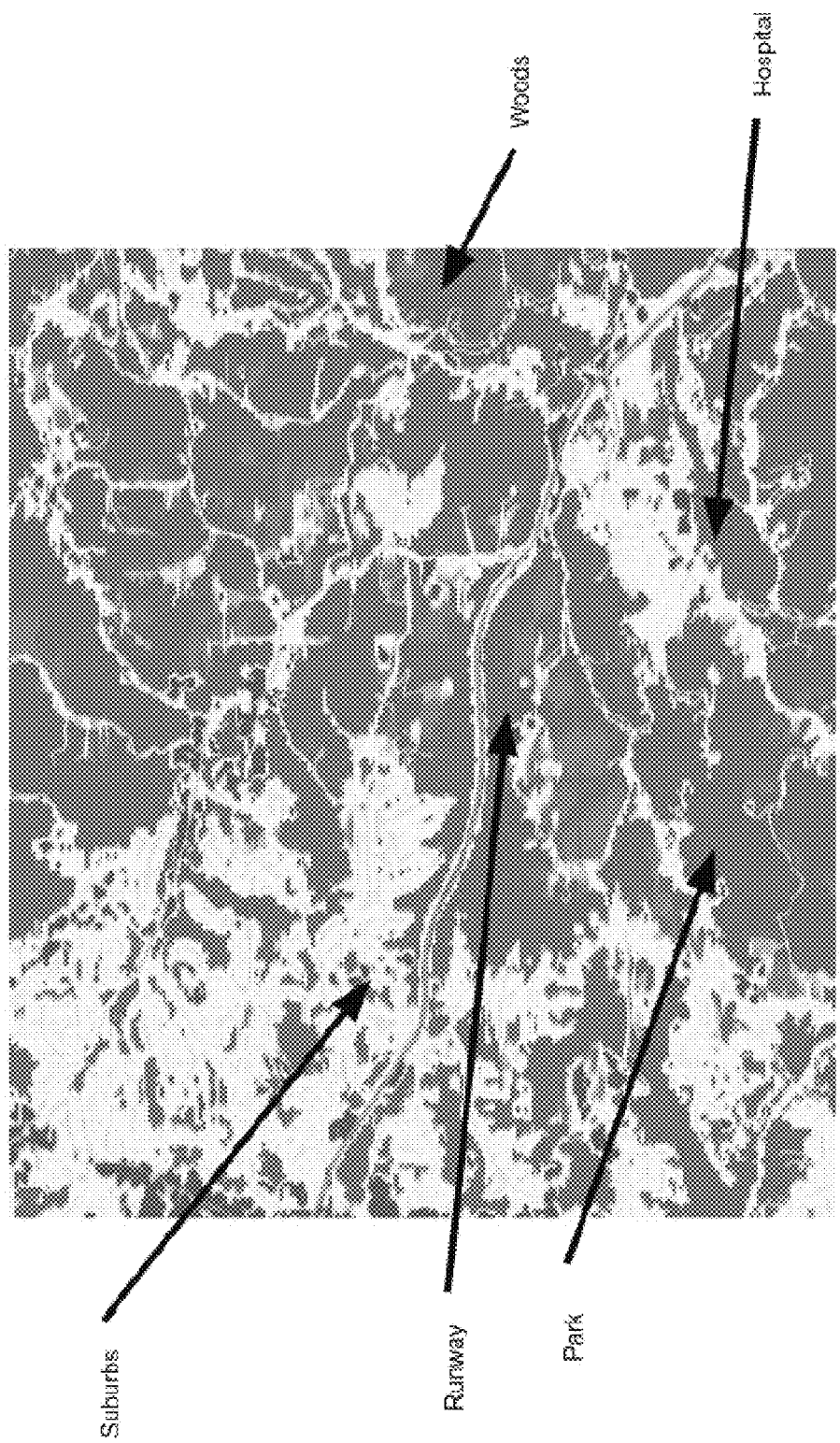

In such an embodiment, the PDR could be defined as the expected dollar value of the property on the ground that is damaged by landing the aircraft at a particular location (e.g., risk to ground property). Similar to the PPR, the risk to ground property can define a damage factor in the landing profiles. The damage factor can be multiplied by the cost of the ground property from the atlas 23 and totaled up over the runway length. FIG. 16 shows an example risk map for the risk to ground property. In this map, the suburbs have a higher value than the surrounding forests or parks. Again, FIG. 16 is for a west heading to the Nardo Airfield.

Figure 17:
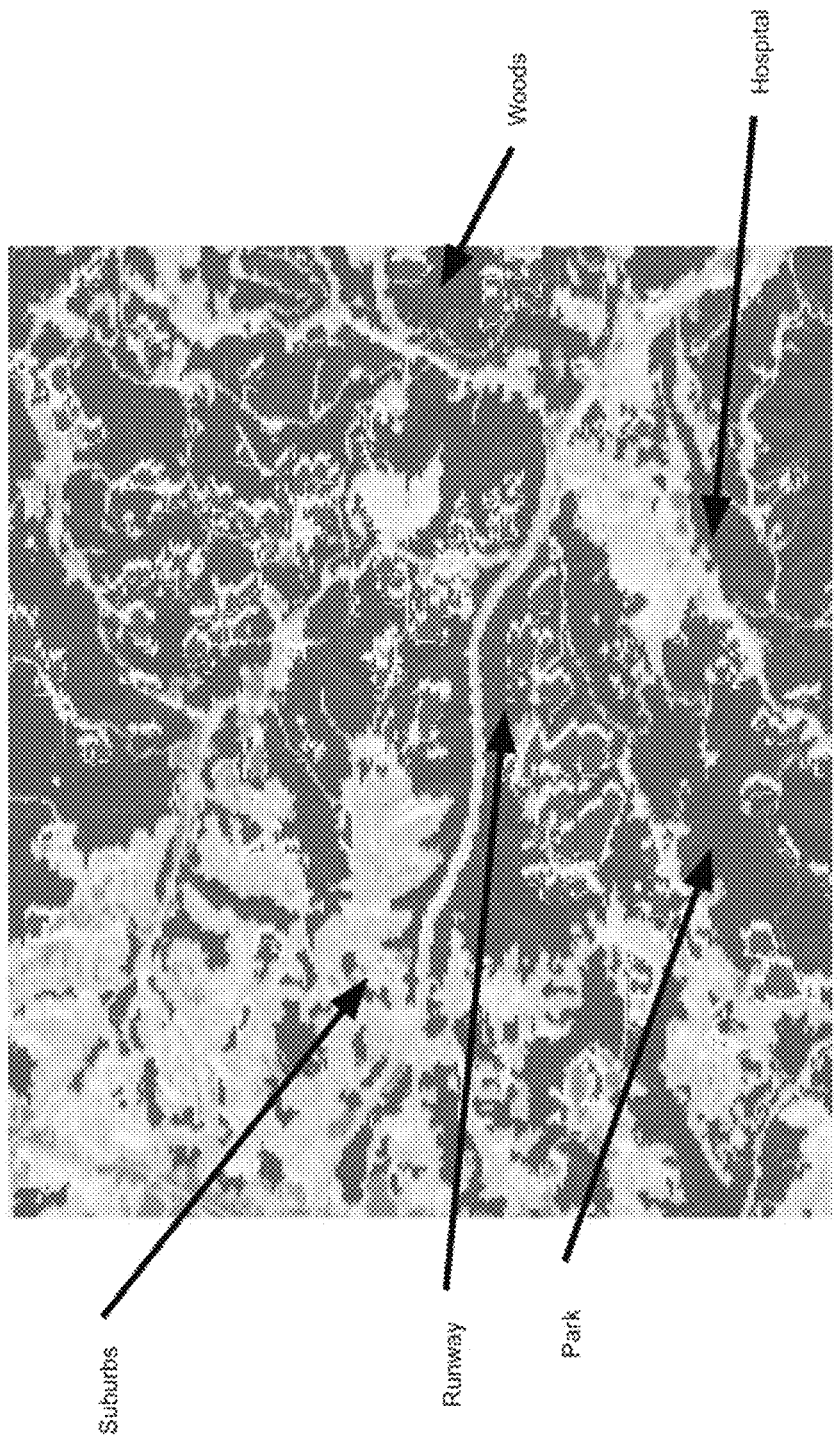

The risk to onboard property (e.g., VDR) can be defined as the total expected cost required to make the vehicle air worthy after making the landing. This cost can be a dollar amount, similar to the risk to ground property. It can be estimated based on the runway length, with the idea is that the longer the runway length, the less damage is sustained by the vehicle in the case of a fixed-wing aircraft. It can be a predefined constant in the case of a vertical landing profile. In one embodiment, each vehicle has a normal stopping distance, and the ratio of this to the simulation stopping distance results in a number between 0 and 1. Then, one minus this number is multiplied by the cost of the airplane to get the estimated cost. FIG. 17 shows the risk to onboard property for the Nardo region. Most of the map indicates high risk (red) because of the thickly wooded area, while the runway is still safe to land on (blue areas).

The on-board person risk (OBPR) may be defined as the expected risk to each onboard person's life. This number can be scaled to the number of passengers onboard the vehicle. In one embodiment, the risk to onboard souls is estimated based on the landcover. If the landcover under the entire landing profile falls under one of the predefined categories, the appropriate risk value is set. Otherwise the risk is set to the maximum value. For example, a runway may have one risk value (e.g., a low risk value); an open grass field may have another risk value (e.g., higher than a runway, but less than the maximum value); and all other landcovers may have the maximum risk value.

In various embodiments, the CLS map generation module 30 first discretizes each individual risk into a set of classes that makes sense for the individual risks, for example: low, medium, and high. A reason for this is trade-off between precision and accuracy, specifically that the accuracy of the individual risk maps likely not match the precision. This mismatch is due to a number of factors, including: errors in the raw data collection; errors in the risk estimation algorithms; and changes in the world not incorporated into the maps. Thus, to make a mission risk that minimizes one or more of the individual risks, the individual risks preferably should first be discretized into ranges that consider the risk accuracy and their situation.

The following is an example of how an the CLS map generation module 30 could be programmed to compute the mission risk from the individual risk values in the risk maps 14, 16, 18, 19. In this example, the operator makes the following high-level risk prioritization:

Minimize risk to ground souls (e.g., PPR); then
Minimize risk to onboard souls (e.g., OBPR); then
Minimize risk to ground property (e.g., PDR); then
Minimize risk to onboard property (e.g., OBPR).

In such an embodiment, the CLS map generation module 30 may first discretize the individual risks for each cell in the risk maps. For example, for each cell in the PPR map 14, a risk of X1 persons (e.g., 1 person) may be considered a low risk and a risk of greater than X2 people (X2>X1, e.g., X2=10) may be considered a catastrophic risk. Each cell in the PPR risk map 14 may then classified into the selected classes (e.g., low, medium, high), with a numerical value assigned to each class. The numerical value is preferably a single-digit integer. For example:

If risk to ground souls ≤1 for cell, then the cell is assigned a value of 1 for PPR;

If risk to ground souls is greater than 1 but less than or equal to 10 for a cell, then the cell is assigned a value of 2 for PPR;

And if the risk to ground souls is greater than 10 for a cell, then the cell is assigned a value of 3 for PPR.

This discretization may be performed for each risk type (e.g., risk maps 14, 16, 18, 19), with each cell of each map being assigned a numerical value indicative of the associated risk, preferably with lower risks being assigned a lower number.

Then, for each cell, the risk values for each of the different types of risk may be combined according to the mission risk prioritization. In one example, this can be done by creating a new number with the digits of the discretized risks by their priority, highest priority first. This results in a single number representing the each of the risk values. For example, if the risks for a given cell were the following:

| Priority | Risk | Value for Cell |
| --- | --- | --- |
| Highest | PPR | 1 |
|  | OBPR | 2 |
|  | PDR | 2 |
| Lowest | VDR | 3 |

Figure 18:
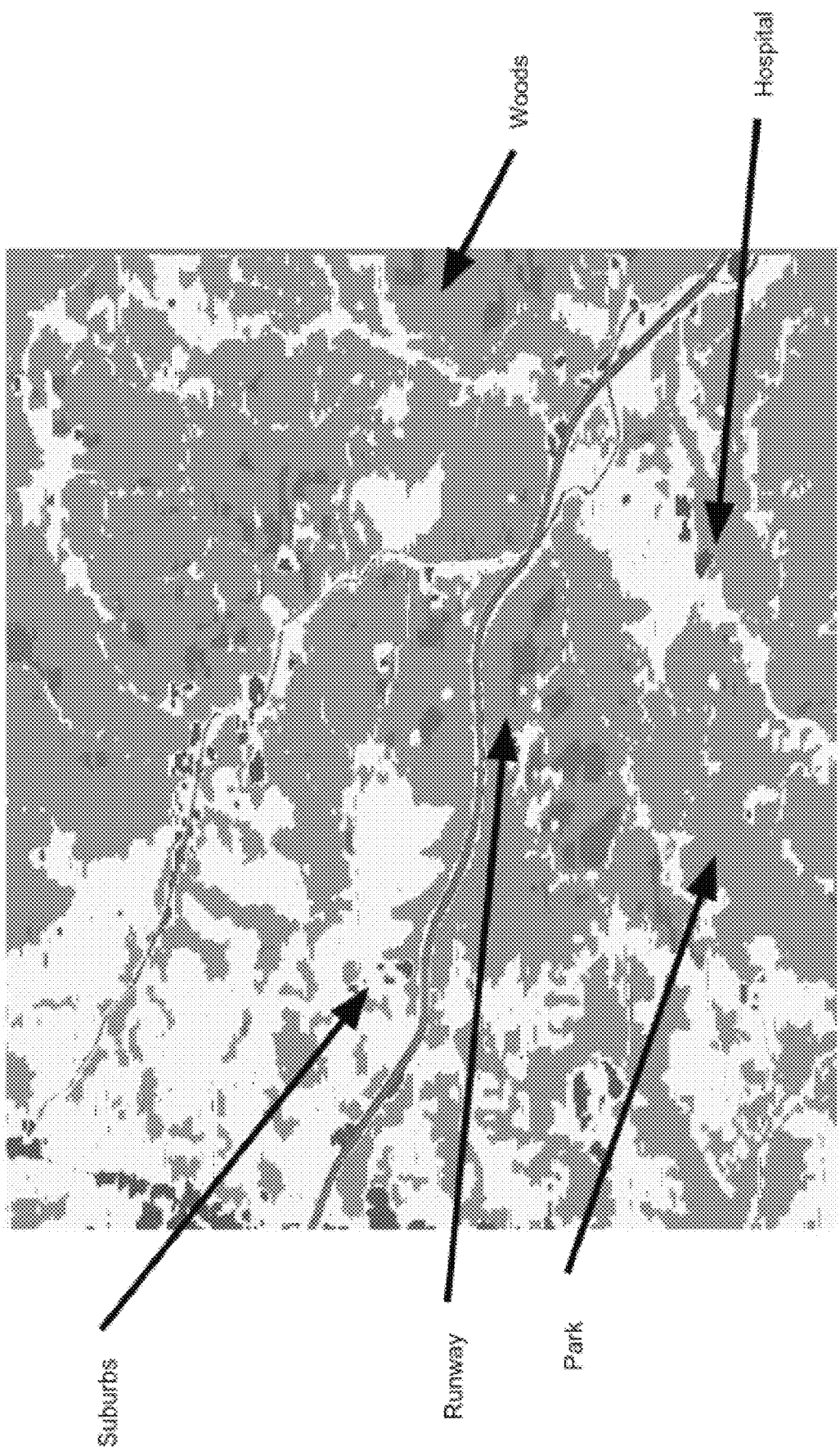

Then the cell's mission risk value would be 1223. The lower the mission risk, the better the place is to land. FIG. 18 shows a sample mission risk for a Cessna 172, wherein low risk areas are indicated with royal blue and the highest risk areas indicated by red.

The above description was for a single heading. This determination of the risk for each cell can be performed for each of the desired headings. For example, if the simulations use four different headings (e.g., N, S, E, W), each cell would be four different risk values—one for each heading. The aircraft can use the appropriate risk value in determining where to land depending on its heading.

The CLS map 12 is preferably used by a flight planning system of the aircraft. That is, when a contingency occurs that requires a rapid landing attempt by the aircraft, the CLS map 12 can quickly identify the best possible landing sites in the vicinity of the aircraft in terms of minimizing the risks. In addition to helping a landing site, the CLS map may be used to select lower risk flight paths (e.g., avoid flying over urban areas) for both nominal mission and emergency path planning, for both autonomous or piloted craft. For a piloted aircraft, the flight planning system can communicate the emergency landing site to the pilot. For an autonomous aircraft, the flight planning system directs the autonomous aircraft to the determined contingency landing site. For more details about flight planning systems, refer to U.S. patent applications (i) Ser. No. 15/152,944, entitled "On-board, computerized landing zone evaluation system for aircraft;" (ii) Ser. No. 15/211,382, entitled "Addressing multiple time around (MTA) ambiguities, particularly for lidar systems, and particularly for autonomous aircraft," (iii) Ser. No. 15/711,492, entitled "Determining Position and Orientation for Aerial Vehicle in GNSS-Denied Situations," filed Sep. 21, 2017; and (iv) Ser. No. 15/872,405, entitled "Body Coordinate Velocity Sensor-Based Alignment for State Estimation," filed Jan. 16, 2018, all of which are incorporated herein by reference in their entireties.

As mentioned above, the algorithms, particularly the algorithm of the CLS map generation module 30, could be tuned for each specific mission. That is, for example, the weighting coefficients (e.g., $k_1$, $k_2$, $k_3$ and $k_4$ above) could be mission specific. For example, if the aircraft is carrying any humans during the mission, the coefficients could be adjusted to prioritize minimizing risk to the aircraft. Conversely, if no humans are on board during the mission, the coefficients could be adjusted to prioritize minimizing risk to the ground property and people at the expense of damage to the aircraft.

The computer system 10 described above could be included on the aircraft or it could compute the CLS map 12 "offline," and the CLS map 12 could be loaded into the on-board memory of the aircraft's computer systems prior to the mission for subsequent use by the flight planning system during flight. Still further, where the aircraft has sufficient wireless data bandwidth, the CLS map 12 and/or updates thereto could be computed on the ground during a mission and transmitted wirelessly to the aircraft during the mission.

Figure 10:
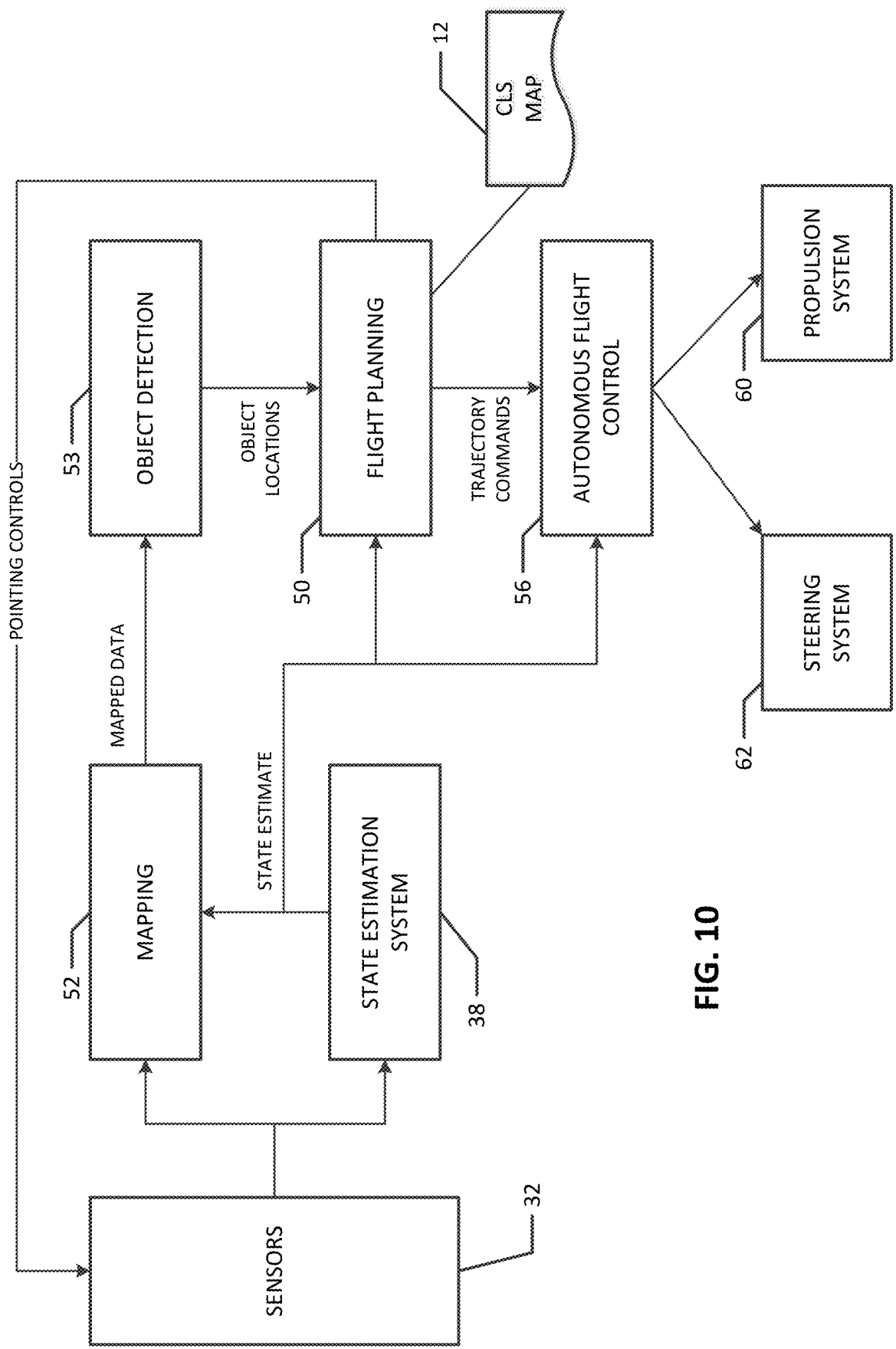
FIGS. 10-12 depict aircraft employing a contingency landing site map according to various embodiments of the present invention.

FIG. 10 shows a block diagram of an unmanned, autonomous aerial vehicle according to various embodiments of the present invention. The aerial vehicle includes sensors 32 mounted or otherwise attached to the aerial vehicle so that they can make measurements and/or sense conditions as the vehicle moves. The sensors 32 may include, for example, a lidar sensor, a camera, a radar unit, a GPS receiver, and/or an IMU. The on-board state estimation computer system 38 continuously estimates the state of the vehicle as it moves. The state estimates can be input to and used by various other systems of the autonomous aerial vehicle. For example, they can be input to a flight planning module 50 that continuously updates the flight plan for the vehicle. The flight planning module 50 can use the CLS map 12 in determining the flight trajectories, particularly in instances where the aircraft has to make an emergency landing. That is, the flight planning module 50 can determine where to attempt a landing based on the CLS map 12 and determine the flight trajectories to navigate the aircraft to the contingency landing site. In such, embodiments, the CLS map 12 could be computed by an on-board computer system of the aircraft (and stored in a memory of an on-board computer system of the aircraft), or the CLS map 12 could be computed offline and stored in a memory of the aircraft's on-board computer system(s).

Continuing with the description of the vehicle shown in FIG. 10, the state estimates from the state estimation computer system 38 can also be input to a mapping module 52, which also receives input data from the sensors 32. The mapping module 52 registers the data it receives from the sensors 32 and the state estimation computer system 38 into a global 3D space by determining where each data measurement it receives belongs in that 3D space. Data mapped by the mapping module 52 can then be communicated to an object detection module 53 for determination of which mapped data represent an "object" of concern (e.g., wires, trees, buildings, bridges, etc.) and which mapped data do not comprise an object of concern. The determinations are input to the flight planning module 50 so that the flight planning module 50 can compute trajectories for the vehicle that avoid the detected objects.

Figure 11:
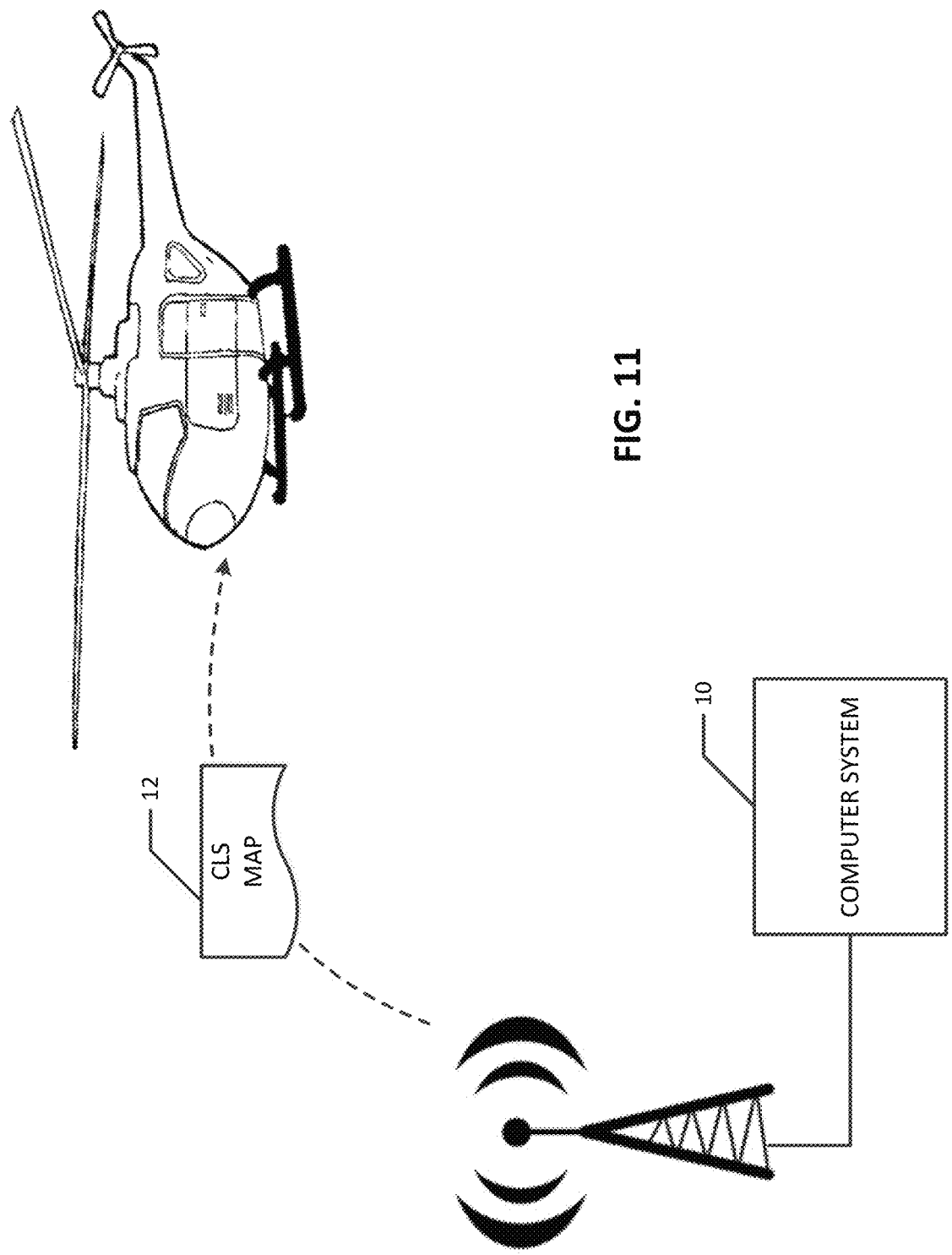

The flight planning module 50 receives data input from the object detection module 53 and the state estimation computer system 38 to continually calculate (e.g., update) a flight path for the craft to follow during its flight. In the context of a fully autonomous rotorcraft, for example, the flight planning module 50 may automatically determine, and continuously update, a flight path or trajectory to follow with little or no human interaction. In various embodiments, an autonomous flight control system 56 receives data input (computed command trajectories) from the flight planning module 50 and executes the movement and general operation of the craft along the calculated flight plan, among performing other tasks. That is, output from the autonomous flight control system 56 is used to control the propulsion system 60 and steering system 62 of the aircraft. The propulsion system(s) 60 may include engines, motors, propellers, propulsive nozzles, and rockets, for example. The steering system(s) 62 may include propeller blade pitch rotators, rudders, elevators, ailerons, etc. Output from the flight planning module 50 can also be used to control in which direction the sensors that are moveable should point, such as the radar, lidar and/or camera systems; that is, they can point, at least part of the time, in the direction in which the vehicle is moving. The CLS map data could also be transmitted to the aircraft during a flight, as shown in FIG. 11.

Figure 12:
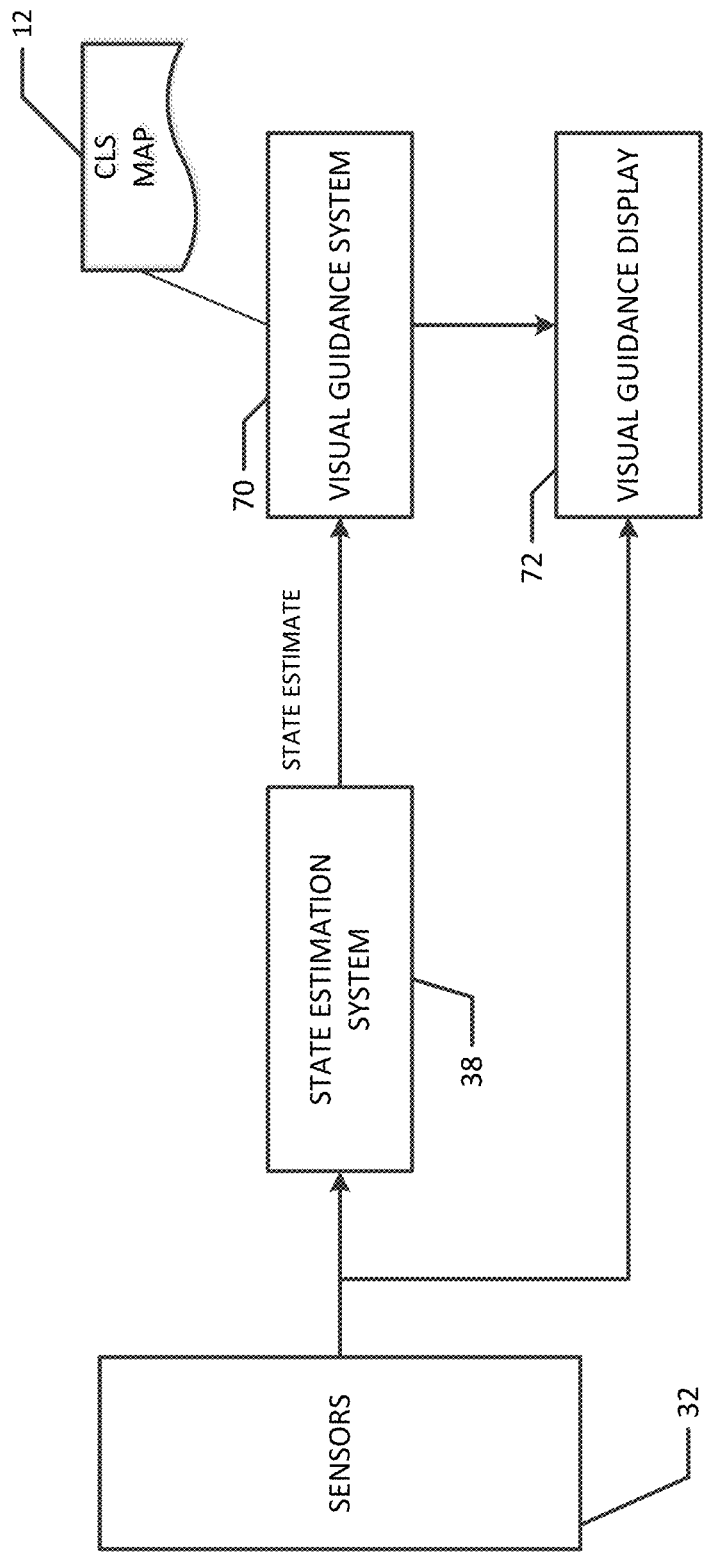

As mentioned above, the CLS map 12 could also be used in a piloted aircraft. FIG. 12 is a simplified block diagram of such a piloted aircraft according to various embodiments of the present invention. The diagram of FIG. 12 is similar to that of FIG. 10, except that in FIG. 12, the state estimates from the state estimation computer system 38 are input to, for example, a visual guidance system 70, which generates and outputs visual guidance displays for the pilot, which are displayed on a visual guidance display 72 that is, for example, in the vehicle's cockpit for easy monitoring by the pilot. The visual guidance system 70 can, for example, fuse images from the certain sensors (e.g., cameras) with aircraft information (e.g., state estimates) to generate real-time imagery for the pilot, which imagery is displayed on the visual guidance display 72. It can also use the CLS map 12 to determine and display a contingency landing site.

Any of the maps 12, 14, 16, 18, 19 may be stored in large geo-referenced data file and may be calculated for each aircraft type and landing profile. In various embodiments, during a mission, the various maps 12, 14, 16, 18, 19 can be accessed with a risk map interface that allows a planner to access the risk data independent of the data source and the data storage implementation. If high resolution data is only available for part of the requested region, the interface can report data at the highest resolution available. The interface can also support a request for "best subsampled risks." For example, if in a given area, the highest resolution data is available in 5×5 m cells, and the planner requests the top five lowest risk cells within a 30×30 $m^2$ region, the interface can return the risk value, coordinates, and heading of the five landing sites with the lowest mission risk within that region. This allows the planner to efficiently select a path to a landing site that has the lowest risk in the case of an emergency.

In various implementations, to preserve memory and reduce CPU load, the risk map interface splits the large manageable datasets into smaller, more efficient tiles of data. These tiles are loaded from the hard disk as needed. That is, when a dataset is requested, the interface can load the data in the region immediately around the start of the mission. As the aircraft proceeds along the planned mission, the risk map interface can cache the regions around the aircraft in anticipation of a risk data request. The risk maps can be continuously updated by the live sensor data, and as such there can be a "data age" field in the risk data. The risk map interface can track all data requests, and if a risk cell has updated information, it can send an update to all sources that have requested that data.

The computer system 10 (whether on-board or offline) may comprise one or more, preferably multi-core, CPUs and/or GPUs and one or more memory units. The memory units may comprise software or instructions that are executed by the processor(s), including the modules 28, 30 described above. The memory units that store the software/instructions that are executed by the processor may comprise primary computer memory, such as RAM or ROM, and/or secondary computer memory, such as hard disk drives and solid state drives. That is, the modules 28, 30 may comprise software, stored in a memory unit, that when executed by the processor(s) of the computer system 10 cause the processor(s) to perform the operations described above. Some or all the described functionality could also be implemented with FPGAs.

The software modules and other computer functions described herein may be implemented in computer software using any suitable computer programming language such as .NET, C, C++, or Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, and ML; and examples of scripting languages include Bourne script, JavaScript, Python, Ruby, Lua, PHP, and Perl.

According to various embodiments, therefore, the present invention is directed to a system that comprises an aircraft and a computer system 10. The computer system 10 comprises a risk map generation module 28 and a CLS map generation module 30. The risk map generation module 28 generates two or more digital risk maps from one or more input maps 20, where each of the two or more digital risk maps indicate a separate risk for landing the aircraft at locations represented in the digital risk maps. The CLS map generation module generates a digital CLS map 12 based on the two or more digital risk maps generated by the risk map generation module 28. The CLS map indicates a suitability for landing the aircraft at locations in the CLS map in a contingency landing situation, and the CLS map is stored in a computer memory onboard the aircraft. The locations represented in the risk maps and the CLS map are along a mission path for the aircraft.

In various implementations, the CLS map generation module generates the CLS map by combining the two or more digital risk maps. Weighting coefficients for combining the two or more digital risk maps are preferably specific to a mission for the aircraft. In addition, the risk maps may comprise a vehicle damage risk map 18 that indicates a risk of damage to the aircraft when landing the aircraft at locations represented in the vehicle damage risk map. The vehicle damage risk map can be generated based on terrain slope and smoothness and/or terrain cover for the locations represented in the vehicle damage risk map. The risk maps might also comprise a property damage risk map 16 that indicates a risk of damage to property on the ground when landing the aircraft at locations represented in the property damage risk map and/or a people presence risk map 14 that indicates a likelihood of people being present at locations represented in the people presence risk map.

In other implementations, the risk maps may comprise one or more of the following: (i) a people presence risk map that estimates a total number of expected fatalities caused by landing the aircraft at various sites in the people presence risk map; (ii) a property damage risk map that estimates an expected dollar value of property on the ground damage by landing the aircraft at various sites in the property damage risk map; (iii) an on-board person risk map that estimates the total number of expected fatalities to persons on-board the aircraft caused by landing the aircraft at various sites in the on-board person risk map; and/or (iv) a vehicle damage risk map that estimates an expected dollar value to repair the aircraft after landing the aircraft at various sites in the vehicle damage risk map.

In addition, the computer system may further comprise a simulation module that simulates landing the aircraft, for one or more headings, at various sites in the risk maps. The risk map generation module can generate the risk maps based on results from the simulations performed by the simulation module. For example, the simulation module may estimate a landing runway for each of the one or more headings for each of the various sites, where the runway length is determined based on factors that comprise a simulated point of impact, landcover at the point of impact, and the type of aircraft. The risk map generation module can use the runway length in the generating the risk maps.

The computer system 10 may be on-board the aircraft and input maps 20 could be stored in a computer database 22 accessible by the computer system. The input maps may comprise a digital elevation map (DEM), a land cover map, a roadway map, a lidar survey map, and/or an aerial image map.

In another general aspect, the present invention is directed to a system that comprises an aircraft and a computer system 10, where the computer system 10 comprises at least one processor 26 and computer memory 24. The computer memory 24 stores software that is executed by the at least one processor 26, where the software comprises instructions that when executed by the at least one processor 26 causes the at least one processor 26 to: (i) generate two or more digital risk maps from one or more input maps, where each of the two or more digital risk maps indicate a separate risk for landing the aircraft at locations represented in the digital risk maps; and (ii) generate the CLS map based on the digital risk maps.

In another general aspect, the present invention is directed to a method that comprises the steps of (i) generating, by a programmed computer system 10, two or more digital risk maps from one or more input maps, wherein each of the two or more digital risk maps indicate a separate risk for landing an aircraft at locations represented in the digital risk maps; (ii) generating, by the programmed computer system 10, a digital contingency landing site (CLS) map 12 based on the two or more digital risk maps, where the CLS map indicates a suitability for landing the aircraft at locations in the CLS map in a contingency landing situation; and (iii) storing the CLS map in a computer memory onboard the aircraft. The method may further comprise the step of determining, by a flight planning module of the aircraft, a landing site for the aircraft in the contingency landing situation based on the CLS map 12.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system comprising:
   an aircraft; and
   a computer system that comprises:
   a risk map generation module that generates two or more digital risk maps from one or more input maps, wherein each of the two or more digital risk maps indicate a separate risk for landing the aircraft at locations represented in the digital risk maps; and
   a contingency landing site (CLS) map generation module that generates a digital CLS map based on the two or more digital risk maps generated by the risk map generation module, wherein the CLS map indicates a suitability for landing the aircraft at locations in the CLS map in a contingency landing situation, and wherein the digital CLS map is stored in a computer memory onboard the aircraft,
   wherein the locations represented in the risk maps and the CLS map are along a mission path for the aircraft.

2. The system of claim 1, wherein the CLS map generation module generates the CLS map by combining the two or more digital risk maps.

3. The system of claim 1, wherein the two or more risk maps comprise a vehicle damage risk map that indicates a risk of damage to the aircraft when landing the aircraft at locations represented in the vehicle damage risk map.

4. The system of claim 3, wherein the vehicle damage risk map is generated based on terrain slope and smoothness for the locations represented in the vehicle damage risk map.

5. The system of claim 3, wherein the vehicle damage risk map is generated based on terrain cover for the locations represented in the vehicle damage risk map.

6. The system of claim 1, wherein the two or more risk maps comprise:
   a first vehicle damage risk map that indicates a risk of damage to the aircraft when landing the aircraft at locations represented in the first vehicle damage risk map based on terrain slope and smoothness for the locations represented in the first vehicle damage risk map; and
   a second vehicle damage risk map that indicates a risk of damage to the aircraft when landing the aircraft at locations represented in the second vehicle damage risk map based on terrain cover for the locations represented in the first vehicle damage risk map.

7. The system of claim 1, wherein the two or more risk maps comprise a property damage risk map that indicates a risk of damage to property on the ground when landing the aircraft at locations represented in the property damage risk map.

8. The system of claim 1, wherein the two or more risk maps comprise a people presence risk map that indicates a likelihood of people being present at locations represented in the people presence risk map.

9. The system of claim 1, wherein the two or more risk maps comprise at least two risk maps selected from the following:
a people presence risk map that estimates a total number of expected fatalities caused by landing the aircraft at various sites in the people presence risk map;
a property damage risk map that estimates an expected dollar value of property on the ground damage by landing the aircraft at various sites in the property damage risk map;
an on-board person risk map that estimates the total number of expected fatalities to persons on-board the aircraft caused by landing the aircraft at various sites in the on-board person risk map; and
a vehicle damage risk map that estimates an expected dollar value to repair the aircraft after landing the aircraft at various sites in the vehicle damage risk map.

10. The system of claim 1, wherein the computer system is on-board the aircraft.

11. The system of claim 1, wherein the one or more input maps are stored in a database accessible by the computer system.

12. The system of claim 11, wherein the one or more input maps comprise at least one map selected from the group consisting of:
a digital elevation map;
a land cover map;
a roadway map;
a lidar survey map; and
an aerial image map.

13. A system comprising:
an aircraft; and
a computer system that comprises at least one processor and computer memory, wherein the computer memory stores software that is executed by the at least one processor, wherein the software comprises instructions that when executed by the at least one processor causes the at least one processor to:
generate two or more digital risk maps from one or more input maps, wherein each of the two or more digital risk maps indicate a separate risk for landing the aircraft at locations represented in the digital risk maps; and
generate a digital contingency landing site (CLS) map based on the two or more digital risk maps, wherein the CLS map indicates a suitability for landing the aircraft at locations in the CLS map in a contingency landing situation, and wherein the digital CLS map is stored in a computer memory onboard the aircraft,
wherein the locations represented in the risk maps and the CLS map are along a mission path for the aircraft.

14. The system of claim 13, wherein the computer system is onboard the aircraft.

15. The system of claim 13, wherein:
the aircraft comprises an autonomous aircraft;
the autonomous aircraft comprises a flight planning module; and
the flight planning module uses the CLS to determine a landing site for the aircraft in the contingency landing situation.

16. A method comprising:
generating, by a programmed computer system, two or more digital risk maps from one or more input maps, wherein each of the two or more digital risk maps indicate a separate risk for landing an aircraft at locations represented in the digital risk maps;
generating, by the programmed computer system, a digital contingency landing site (CLS) map based on the two or more digital risk maps, wherein the CLS map indicates a suitability for landing the aircraft at locations in the CLS map in a contingency landing situation; and
storing the CLS map in a computer memory onboard the aircraft.

17. The method of claim 16, wherein:
the aircraft comprises an autonomous aircraft;
the autonomous aircraft comprises a flight planning module; and
the method further comprising the step of determining, by the flight planning module, a landing site for the aircraft in the contingency landing situation based on the CLS map.

18. A system comprising:
an aircraft; and
a computer system that comprises:
a risk map generation module that generates two or more digital risk maps from one or more input maps, wherein each of the two or more digital risk maps indicate a separate risk for landing the aircraft at locations represented in the digital risk maps; and
a contingency landing site (CLS) map generation module that generates a digital CLS map based on the two or more digital risk maps generated by the risk map generation module, wherein the CLS map indicates a suitability for landing the aircraft at locations in the CLS map in a contingency landing situation, and wherein the digital CLS map is stored in a computer memory onboard the aircraft,
wherein the locations represented in the risk maps and the CLS map are along a mission path for the aircraft,
wherein the CLS map generation module generates the CLS map by combining the two or more digital risk maps, and
wherein weighting coefficients for combining the two or more digital risk maps are specific to a mission for the aircraft.

19. A system comprising:
an aircraft; and
a computer system that comprises:
a risk map generation module that generates two or more digital risk maps from one or more input maps, wherein each of the two or more digital risk maps indicate a separate risk for landing the aircraft at locations represented in the digital risk maps; and
a contingency landing site (CLS) map generation module that generates a digital CLS map based on the two or more digital risk maps generated by the risk map generation module, wherein the CLS map indicates a suitability for landing the aircraft at locations in the CLS map in a contingency landing situation, and wherein the digital CLS map is stored in a computer memory onboard the aircraft,
wherein the locations represented in the risk maps and the CLS map are along a mission path for the aircraft,
wherein the two or more risk maps comprise:
a vehicle damage risk map that indicates a risk of damage to the aircraft when landing the aircraft at locations represented in the vehicle damage risk map;

a property damage risk map that indicates a risk of damage to property on the ground when landing the aircraft at locations represented in the property damage risk map; and a people presence risk map that indicates a likelihood of people being present at locations represented in the people presence risk map;

the CLS map generation module generates the CLS map by combining the vehicle damage risk map, the property damage risk map, and the people presence risk map; and weighting coefficients for combining the vehicle damage risk map, the property damage risk map, and the people presence risk map are specific to a mission for the aircraft.

20. The system of claim 19, wherein:

the aircraft comprises an autonomous aircraft;

the autonomous aircraft comprises a flight planning module; and the flight planning module uses the CLS to determine a landing site for the aircraft in the contingency landing situation.

21. A system comprising:

an aircraft; and a computer system that comprises:

a risk map generation module that generates two or more digital risk maps from one or more input maps, wherein each of the two or more digital risk maps indicate a separate risk for landing the aircraft at locations represented in the digital risk maps; and a contingency landing site (CLS) map generation module that generates a digital CLS map based on the two or more digital risk maps generated by the risk map generation module, wherein the CLS map indicates a suitability for landing the aircraft at locations in the CLS map in a contingency landing situation, and wherein the digital CLS map is stored in a computer memory onboard the aircraft, wherein the locations represented in the risk maps and the CLS map are along a mission path for the aircraft, wherein the computer system further comprises a simulation module that simulates landing the aircraft at various sites in the two or more risk maps, and the risk map generation module generates the two or more risk maps based on results from the simulations performed by the simulation module.

22. The system of claim 21, wherein the simulation module simulates landing the aircraft for two or more different headings at the various sites in the two or more risk maps.

23. A system comprising:

an aircraft; and a computer system that comprises:

a risk map generation module that generates two or more digital risk maps from one or more input maps, wherein each of the two or more digital risk maps indicate a separate risk for landing the aircraft at locations represented in the digital risk maps; and a contingency landing site (CLS) map generation module that generates a digital CLS map based on the two or more digital risk maps generated by the risk map generation module, wherein the CLS map indicates a suitability for landing the aircraft at locations in the CLS map in a contingency landing situation, and wherein the digital CLS map is stored in a computer memory onboard the aircraft, wherein the locations represented in the risk maps and the CLS map are along a mission path for the aircraft, wherein the two or more risk maps comprise:

a people presence risk map that estimates a total number of expected fatalities caused by landing the aircraft at various sites in the people presence risk map;

a property damage risk map that estimates an expected dollar value of property on the ground damage by landing the aircraft at various sites in the property damage risk map;

an on-board person risk map that estimates the total number of expected fatalities to persons on-board the aircraft caused by landing the aircraft at various sites in the on-board person risk map; and a vehicle damage risk map that estimates an expected dollar value to repair the aircraft after landing the aircraft at various sites in the vehicle damage risk map.

24. The system of claim 23, wherein:

the computer system further comprises a simulation module that simulates landing the aircraft, for one or more headings, at various sites in the risk maps;

the risk map generation module generates the risk maps based on results from the simulations performed by the simulation module.

25. The system of claim 24, wherein:

the simulation module estimates a landing runway for each of the one or more headings for each of the various sites;

the runway length is determined based on factors that comprise a simulated point of impact, landcover at the point of impact, and type of aircraft; and the risk map generation module uses the runway length in generating the risk maps.

* * * * *